US009420160B2

(12) United States Patent
Yoshida

(10) Patent No.: US 9,420,160 B2
(45) Date of Patent: Aug. 16, 2016

(54) INFORMATION PROCESSING APPARATUS, INFORMATION PROCESSING METHOD, PROGRAM, AND VISION MEASURING APPARATUS

(71) Applicant: MITUTOYO CORPORATION, Kanagawa (JP)

(72) Inventor: Hiroyuki Yoshida, Hiroshima (JP)

(73) Assignee: MITUTOYO CORPORATION, Kanagawa (JP)

( * ) Notice: Subject to any disclaimer, the term of this patent is extended or adjusted under 35 U.S.C. 154(b) by 91 days.

(21) Appl. No.: 14/482,405

(22) Filed: Sep. 10, 2014

(65) Prior Publication Data
US 2015/0070566 A1   Mar. 12, 2015

(30) Foreign Application Priority Data

Sep. 12, 2013 (JP) ................................. 2013-189354

(51) Int. Cl.
| H04N 5/232 | (2006.01) |
| G01C 11/02 | (2006.01) |
| G03B 13/34 | (2006.01) |
| G02B 7/28 | (2006.01) |
| G03B 13/36 | (2006.01) |

(52) U.S. Cl.
CPC ............ *H04N 5/23212* (2013.01); *G01C 11/02* (2013.01); *G03B 13/36* (2013.01)

(58) Field of Classification Search
None
See application file for complete search history.

(56) References Cited

U.S. PATENT DOCUMENTS

| 2004/0036777 A1* | 2/2004 | Yasuda | H04N 5/23212 348/211.9 |
| 2010/0158343 A1* | 6/2010 | Bryll | G02B 7/36 382/141 |
| 2013/0141631 A1* | 6/2013 | Suto | G02B 7/365 348/349 |
| 2013/0176617 A1* | 7/2013 | Tamura | G02B 21/00 359/383 |

FOREIGN PATENT DOCUMENTS

JP      10-48506 A      2/1998

OTHER PUBLICATIONS

U.S. Appl. No. 14/315,826 to Shohei Udo, filed Jun. 26, 2014.

* cited by examiner

*Primary Examiner* — Mark Monk
(74) *Attorney, Agent, or Firm* — Greenblum & Bernstein, P.L.C.

(57) ABSTRACT

A method includes obtaining a plurality of object images taken by an image pickup device while moving a focal position within a predetermined range, the image pickup device being capable of taking images at arbitrary focal positions within the predetermined range; calculating a first in-focus position within the predetermined range based on pieces of contrast information on a manually-taken object image group, the manually-taken object image group including the plurality of object images taken while manually moving the focal position within the predetermined range; and calculating a second in-focus position within the search range based on pieces of contrast information on an automatically-taken object image group including the plurality of object images taken while automatically moving the focal position within a search range, the search range being determined with reference to the calculated first in-focus position.

17 Claims, 24 Drawing Sheets

INFORMATION PROCESSING APPARATUS, INFORMATION PROCESSING METHOD, PROGRAM, AND VISION MEASURING APPARATUS

CROSS REFERENCE TO RELATED APPLICATIONS

This application claims the benefit of Japanese Priority Patent Application JP 2013-217442 filed Sep. 12, 2013, the entire contents of which are incorporated herein by reference.

BACKGROUND

The present disclosure relates to an information processing apparatus, an information processing method, a program, and a vision measuring apparatus, which are used when taking an image of an object for measurement, observation, or the like, for example.

There is known a system in which a computer processes an image, which is a taken image of an object, for observation, measurement, or the like. Such a system is used in for example examination, in which an enlarged image obtained by a microscope is used, CNC (Computer Numerical Control) measurement, or the like.

Japanese Patent Application Laid-open No. H10-48506 discloses a microscope image-pickup system. A biological microscope or the like obtains an enlarged image of an object-under-test. The microscope image-pickup system takes a picture of the enlarged image of the object-under-test. According to the system, focusing is performed visually, and the camera view is determined visually. After that, two-level autofocus is performed. The two-level autofocus includes rough focus operation and precise focus operation. First, in the rough focus operation, a wide scan range is roughly scanned, and a focus point is detected roughly. Next, in the precise focus operation, a narrow scan range, which includes the rough focus point, is scanned, and a focus point is detected precisely. If the two-level autofocus operation is performed, it is possible to reduce the time of the autofocus operation (Japanese Patent Application Laid-open No. H10-48506, paragraphs [0001], [0018], [0043], etc.).

SUMMARY

As shown in FIG. 6 of Japanese Patent Application Laid-open No. H10-48506, according to the technology of this document, if a contrast peak value P1 does not exist in a first operation width W1 of the rough focus, then another range having the first operation width W1 is further scanned. In other words, the first scan is needless. It takes a longer time to perform autofocus resulting from the needless scan. It is desirable to provide a technology capable of calculating an in-focus position at a higher velocity to prevent such a situation from occurring, for example.

In view of the above-mentioned circumstances, it is desirable to provide an information processing apparatus, an information processing method, a program, and a vision measuring apparatus capable of calculating an in-focus position at a high velocity.

According to an embodiment of the present disclosure, an information processing apparatus includes an obtaining unit, a first calculator, and a second calculator.

The obtaining unit is configured to obtain a plurality of object images, the plurality of object images being taken by an image pickup device while moving a focal position within a predetermined range, the image pickup device being capable of taking images of an object at arbitrary focal positions within the predetermined range.

The first calculator is capable of calculating a first in-focus position within the predetermined range based on pieces of contrast information on a manually-taken object image group, the manually-taken object image group including the plurality of object images taken while manually moving the focal position within the predetermined range.

The second calculator is capable of calculating a second in-focus position within the search range based on pieces of contrast information on an automatically-taken object image group, the automatically-taken object image group including the plurality of object images taken while automatically moving the focal position within a search range, the search range being determined with reference to the calculated first in-focus position.

According to the information processing apparatus, a manually-taken object image group is obtained while manually moving a focal position. A first in-focus position is calculated based on pieces of contrast information on the manually-taken object image group. Further, a second in-focus position is calculated based on an automatically-taken object image group. The automatically-taken object image group is obtained while automatically moving a focal position within a search range determined with reference to the first in-focus position. As a result, it is possible to prevent needless scanning from occurring sufficiently in scanning in which a focal position is moved automatically. It is possible to calculate an in-focus position at a high velocity.

The information processing may further include a driver.

The driver is capable of moving the focal position within the predetermined range.

In this case, the driver may be configured to move the focal position to one of end points of the search range at a first velocity, and to move the focal position within the search range at a second velocity lower than the first velocity.

As described above, a focal position is moved to an end point of the search range at a high velocity. Scan is performed automatically within the search range at a low velocity. As a result, it is possible to calculate an in-focus position at a high velocity.

The information processing apparatus may further include an operation input unit.

An instruction is input in the operation input unit by a user.

In this case, the first calculator may be configured to calculate the first in-focus position in response to an operation to manually move the focal position by the user. The second calculator may be configured to calculate the second in-focus position in response to an autofocus instruction input in the operation input unit by the user.

As described above, an autofocus instruction may be input after a first in-focus position is calculated and a search range is determined. As a result, it is possible to reduce the time to perform autofocus sufficiently.

The information processing apparatus may further include a determining unit.

The determining unit is configured to determine that the first in-focus position is invalid if a predetermined time period passes after the first in-focus position is calculated and the autofocus instruction is not input within the predetermined time period.

For example, an object may be replaced, an image pickup condition may be changed, or the like after a first in-focus position is calculated. In this case, autofocus with reference to the first in-focus position is likely to be needless. According to the present disclosure, a first in-focus position is invalid after a predetermined time period passes. As a result, it is possible to prevent such needless autofocus from occurring.

The first calculator may be configured to calculate a contrast peak value within the predetermined range based on pieces of contrast information on the manually-taken object image group, and to calculate the first in-focus position, the first in-focus position being the focal position corresponding to the peak value. The determining unit may be configured to attenuate the contrast peak value at a predetermined rate, and to set the predetermined time period, the predetermined time period being a time period until the attenuated peak value falls below a predetermined threshold.

As described above, a peak value may be attenuated at a predetermined rate to thereby determine validity of a first in-focus position. As a result, the validity of a first in-focus position is determined based on the above-mentioned predetermined time period, which is based on a peak value.

The first calculator may be configured to calculate a function based on pieces of contrast information on the manually-taken object image group, the function showing relation between the focal position within the predetermined and the contrast information, and to calculate the contrast peak value, the contrast peak value being a peak value of the function.

For example model function fitting may be performed to calculate the above-mentioned function. The peak value of the function may be calculated as a contrast peak value.

The information processing apparatus may further include storage.

The storage is configured to store a map-for-calculation, the map-for-calculation including a plurality of divided areas.

In this case, the first calculator may be configured to calculate divided-area in-focus positions based on pieces of contrast information on a plurality of divided areas, the divided-area in-focus positions being the first in-focus positions of the plurality of divided areas, the plurality of divided areas being obtained by dividing the object image corresponding to a plurality of areas of the map-for-calculation, and to calculate the first in-focus position based on pieces of information on the divided-area in-focus positions.

The information processing apparatus uses a map-for-calculation including a plurality of divided areas.

A plurality of divided areas is obtained by dividing the object image. The plurality of divided areas are set corresponding to a plurality of areas of a map-for-calculation. Further, divided-area in-focus positions are calculated based on pieces of contrast information on the divided areas. The divided-area in-focus positions are first in-focus positions of the divided areas. The first calculator calculates the first in-focus position of the entire object image based on the pieces of divided-area in-focus position information. As described above, the divided-area in-focus positions are calculated for the plurality of divided areas. As a result, it is possible to calculate the first in-focus position with a high degree of accuracy.

The first calculator may be configured to calculate the first in-focus position based on the pieces of information on the divided-area in-focus positions for calculation-object areas, the calculation-object areas being some divided areas of the plurality of divided areas, the some divided areas overlapping with a reference area in the object image, the reference area being a reference to calculate the first in-focus position.

As described above, the calculation-object areas overlapping with the reference area may be set. The first in-focus position may be calculated based on the pieces of divided-area in-focus position information on the calculation-object areas. As a result, it is possible to calculate a first in-focus position with a high degree of accuracy.

The first calculator may be configured to weight the calculation-object areas based on sizes of areas overlapping with the reference area and based on pieces of contrast information on the calculation-object areas, and to calculate the first in-focus position.

As a result, it is possible to calculate a first in-focus position with a high degree of accuracy.

The information processing apparatus may further include a driver.

The driver is capable of moving the focal position within the predetermined range.

In this case, the driver may be configured to move the focal position to one of end points of the search range at a first velocity, and to move the focal position within the search range at a second velocity lower than the first velocity.

The image pickup device may be capable of taking an image of the object at an arbitrary image pickup position on a 2D (two-dimensional) plane parallel to a mount surface on which the object is mounted. In this case, the driver may be capable of moving the image pickup position on the 2D plane. Further, the map-for-calculation may have a larger area than an image pickup area of the object image, the map-for-calculation containing the image pickup area, the map-for-calculation being moved as the image pickup position is moved.

According to the information processing apparatus, it is possible to take an image while moving an image pickup position as necessary on a 2D plane parallel to a mount surface on which an object is mounted. The map-for-calculation contains an image pickup area of an object image. The map-for-calculation is moved as the image pickup position is moved. As a result, even if the image pickup position is moved, it is possible to calculate the in-focus position at the new position at a high velocity.

The storage may be configured to store pieces of contrast information and pieces of divided-area in-focus position information on divided areas of the object image for areas of the map-for-calculation, the divided areas of the object image corresponding to the areas of the map-for-calculation. In this case, the first calculator may be configured, if the image pickup position is moved, to refer to the pieces of contrast information and the pieces of divided-area in-focus position information on the areas of the map-for-calculation, the pieces of contrast information and the pieces of divided-area in-focus position information being stored before the image pickup position is moved, and to calculate the divided-area in-focus positions of divided areas of the moved object image.

For example an image of an object is taken while moving an image pickup position. In this case, pieces of contrast information and pieces of divided-area in-focus position on divided areas are stored for each taken image. In this case, some moved divided areas may be in a set range of a yet-to-be-moved map-for-calculation. In this case, pieces of contrast information and pieces of divided-area in-focus position information on areas of the map-for-calculation corresponding to those divided areas may be stored before the image pickup position is moved. In this case, the information stored before the image pickup position is used. As a result, it is possible to calculate the moved divided-area in-focus positions in a short time.

The obtaining unit may be configured to obtain the plurality of object images, the plurality of object images being obtained by taking images of the object, the images of the object being formed by an optical system including an objective lens. In this case, the storage may be configured to store the map-for-calculation for the objective lens of the optical system, the map-for-calculation being used to calculate the first in-focus position.

As a result, it is possible to calculate a first in-focus position even if an objective lens is interchanged or the like.

According to an embodiment of the present disclosure, there is provided an information processing method executed by a computer.

A plurality of object images are obtained, the plurality of object images being taken by an image pickup device while moving a focal position within a predetermined range, the image pickup device being capable of taking images of an object at arbitrary focal positions within the predetermined range.

A first in-focus position within the predetermined range is calculated based on pieces of contrast information on a manually-taken object image group, the manually-taken object image group including the plurality of object images taken while manually moving the focal position within the predetermined range.

A second in-focus position within the search range is calculated based on pieces of contrast information on an automatically-taken object image group, the automatically-taken object image group including the plurality of object images taken while automatically moving the focal position within a search range, the search range being determined with reference to the calculated first in-focus position.

According to an embodiment of the present disclosure, there is provided a program, causing a computer to execute the steps of:

obtaining a plurality of object images, the plurality of object images being taken by an image pickup device while moving a focal position within a predetermined range, the image pickup device being capable of taking images of an object at arbitrary focal positions within the predetermined range;

calculating a first in-focus position within the predetermined range based on pieces of contrast information on a manually-taken object image group, the manually-taken object image group including the plurality of object images taken while manually moving the focal position within the predetermined range; and calculating a second in-focus position within the search range based on pieces of contrast information on an automatically-taken object image group, the automatically-taken object image group including the plurality of object images taken while automatically moving the focal position within a search range, the search range being determined with reference to the calculated first in-focus position.

According to an embodiment of the present disclosure, there is provided a vision measuring apparatus including an image pickup unit, the above-mentioned obtaining unit, the above-mentioned first calculator, and the above-mentioned second calculator.

The image pickup unit is capable of taking images of an object at arbitrary focal positions within a predetermined range.

According to an embodiment of the present disclosure, there is provided an information processing apparatus including an obtaining unit, storage, a setup unit, and a calculator.

The obtaining unit is configured to obtain a plurality of object images, the plurality of object images being taken by an image pickup device while moving a focal position within a predetermined range, the image pickup device being capable of taking images of an object at arbitrary focal positions within the predetermined range.

The storage is configured to store a map-for-calculation, the map-for-calculation including a plurality of divided areas.

The setup unit is configured to set a plurality of divided areas for each of the plurality of object images, the plurality of divided areas being obtained by dividing the object image, the plurality of divided areas corresponding to the plurality of areas of the map-for-calculation.

The calculator is configured to calculate divided-area in-focus positions for the divided areas based on pieces of contrast information on the plurality of divided areas, the plurality of divided areas being set for each object image, the divided-area in-focus positions being within the predetermined range, and to calculate an in-focus position of the object image within the predetermined range based on pieces of information on the divided-area in-focus positions.

According to the information processing apparatus, a map-for-calculation is used. The map-for-calculation includes a plurality of divided areas. A plurality of divided areas are set, the plurality of divided areas being obtained by dividing the object image, the plurality of divided areas corresponding to the plurality of areas of the map-for-calculation. Further, divided-area in-focus positions is calculated for the divided areas based on pieces of contrast information on the plurality of divided areas, the divided-area in-focus positions being within the predetermined range. The first calculator calculates an in-focus position of the object image within the predetermined range based on pieces of information on the divided-area in-focus positions. As described above, divided-area in-focus positions are calculated for a plurality of divided areas. As a result, it is possible to calculate an in-focus position with a high degree of accuracy.

As described above, according to the present disclosure, it is possible to calculate an in-focus position at a high velocity.

DETAILED DESCRIPTION OF EMBODIMENTS

Hereinafter, an embodiment of the present disclosure will be described with reference to the drawings.

[Configuration of Vision Measuring Apparatus]

Figure 1:
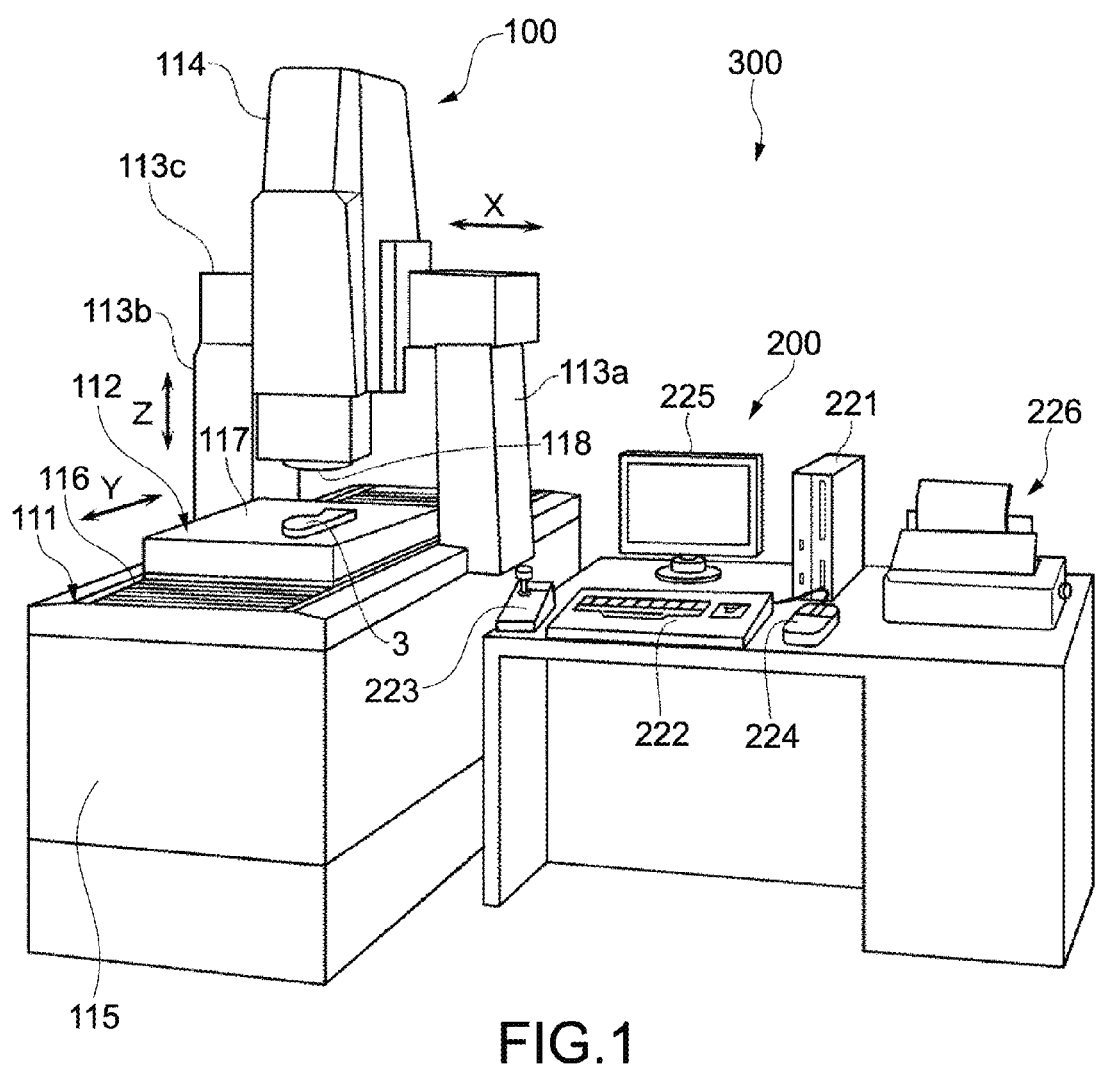
FIG. 1 is a diagram schematically showing an example of the configuration of a vision measuring apparatus according to an embodiment of the present disclosure.

FIG. 1 is a diagram schematically showing an example of the configuration of a vision measuring apparatus according to an embodiment of the present disclosure. The vision measuring apparatus 300 includes a contactless vision measuring system 100 and a PC (Personal Computer) 200. The PC 200 drives and controls the vision measuring system 100, and processes data as necessary. The PC 200 functions as an information processing apparatus of this embodiment. Note that any computer other than a PC may be used as the information processing apparatus of this embodiment.

The vision measuring system 100 includes a mount 111, a stage 112, and an image pickup unit 114. The mount 111 is a means for moving a sample. The stage 112 is mounted on the mount 111. The image pickup unit 114 is arranged above the stage 112.

The mount 111 includes a base 115. The base 115 includes a main surface 116. The main surface 116 has short sides in a first direction (X-axis direction) and long sides in a second direction (Y-axis direction). The first direction is orthogonal to the second direction. Two columns 113a and 113b are arranged on the two long sides of the base 115, respectively. The two columns 113a and 113b extend upward (in Z-axis direction). A guide 113c is arranged between the two columns 113a and 113b. The guide 113c extends in the X-axis direction.

The stage 112 includes a mount surface 117. A work 3, i.e., a measured object, is mounted on the mount surface 117. The mount surface 117 is mounted on the main surface 116 of the mount 111 such that the mount surface 117 may be in parallel to the horizontal direction. The mount 111 includes a Y-axis driver mechanism (not shown) on the main surface 116. The Y-axis driver mechanism moves the stage 112 in the Y-axis direction. The PC 200 controls the Y-axis driver mechanism. As a result, the stage 112 moves in the Y-axis direction. The configuration of the Y-axis driver mechanism is not limited and may be designed as necessary.

The image pickup unit 114 is mounted on the guide 113c arranged between the two columns 113a and 113b. The guide 113c includes an X-axis driver mechanism (not shown). The PC 200 controls the X-axis driver mechanism. As a result, the image pickup unit 114 moves in the X-axis direction. The configuration of the X-axis driver mechanism is not limited and may be designed as necessary.

A camera 118 is mounted on the image pickup unit 114 such that the camera 118 may face the stage 112. The camera 118 functions as an image pickup device (image pickup unit). The camera 118 includes for example a CMOS (Complementary Metal Oxide Semiconductor) or CCD (Charge Coupled Devices) sensor and the like. Another camera may be used.

The camera 118 is capable of taking an image of an object, i.e., the work 3. The camera 118 is capable of moving in the Z-axis direction (focal-axis direction), i.e., the optical-axis direction. The camera 118 is capable of taking an image of the object, i.e., the work 3, at an arbitrary focal position within a predetermined range. The image pickup unit 114 includes a Z-axis driver mechanism (not shown). The Z-axis driver mechanism moves the camera 118 in the Z-axis direction. The PC 200 controls the Z-axis driver mechanism. As a result, the camera 118 moves in the Z-axis direction. As a result, the focal position of the camera 118 moves.

A user may operate a mouse or the like, whereby the camera 118 moves in the Z-axis direction and the focal position moves. Alternatively, for example, the camera 118 may move automatically in the Z-axis direction and the focal position may move automatically in response to an autofocus (hereinafter referred to as AF) instruction or the like. A user may input an operation, whereby a focal position is moved (i.e., focal position is moved manually). The PC 200 may control and move a focal position in response to an AF instruction or the like (i.e., focal position is moved automatically).

The kind of the vision measuring system 100 is not limited. Any apparatus may be used as long as it for example measures and observes an object image, which is a taken image of the work 3, and as long as it is capable of moving a focal position manually and automatically. For example, the vision measuring system 100 may be an image probe such as a CNC vision measuring system or a CNC 3D (three-dimensional) measuring system, a hardness testing machine, or the like. Further, the present disclosure is applicable to digital microscopes. A digital camera of a digital microscope takes an image of an enlarged image obtained by an optical microscope. In this case, an imaging optical system including an objective lens generates an enlarged image of an object. The image pickup device (image pickup unit) includes the imaging optical system. Typically, the objective lens moves in the Z-axis direction, whereby the focal position is moved.

In the example of FIG. 1, the image pickup unit 114 is driven in the X-axis direction, and the stage 112 is driven in the Y-axis direction. As a result, it is possible to move the image pickup position of the camera 118 in the XY plane direction relative to the mount surface 117 of the stage 112. In other words, the camera 118 of the vision measuring system 100 is capable of taking an image of the work 3 at an arbitrary image pickup position on a 2D plane parallel to the mount surface 117, on which the work 3 is mounted. Note that the image pickup position is the position of an area, whose image is taken by the camera 118 (image pickup area). The camera 118 takes an image (object image) of an area in the image pickup area.

The camera 118 may have any configuration to move the image pickup position in the XY plane direction. For example, the stage 112 is capable of being driven in both the X-axis direction and the Y-axis direction. Further, the image pickup unit 114 is capable of being driven in both the X-axis direction and the Y-axis direction. Alternatively, the stage 112 is capable of being driven in the XY plane direction, the image pickup unit 114 is capable of being driven in the XY plane direction, and the relative position relation between the stage 112 and the image pickup unit 114 may be controlled arbitrarily.

The PC 200 includes a main PC 221, a keyboard 222, a joystick box (hereinafter referred to as J/S) 223, a mouse 224, a display 225, and a printer 226. The keyboard 222, the J/S 223, and the mouse 224 function as operation input units, in which instructions are input by a user. The display 225 functions as a display unit. For example the display 225 is a liquid crystal, EL (Electro-Luminescence), or CRT (Cathode Ray Tube) display device or the like. The printer 226 is capable of printing out measurement results and the like for example.

Figure 2:
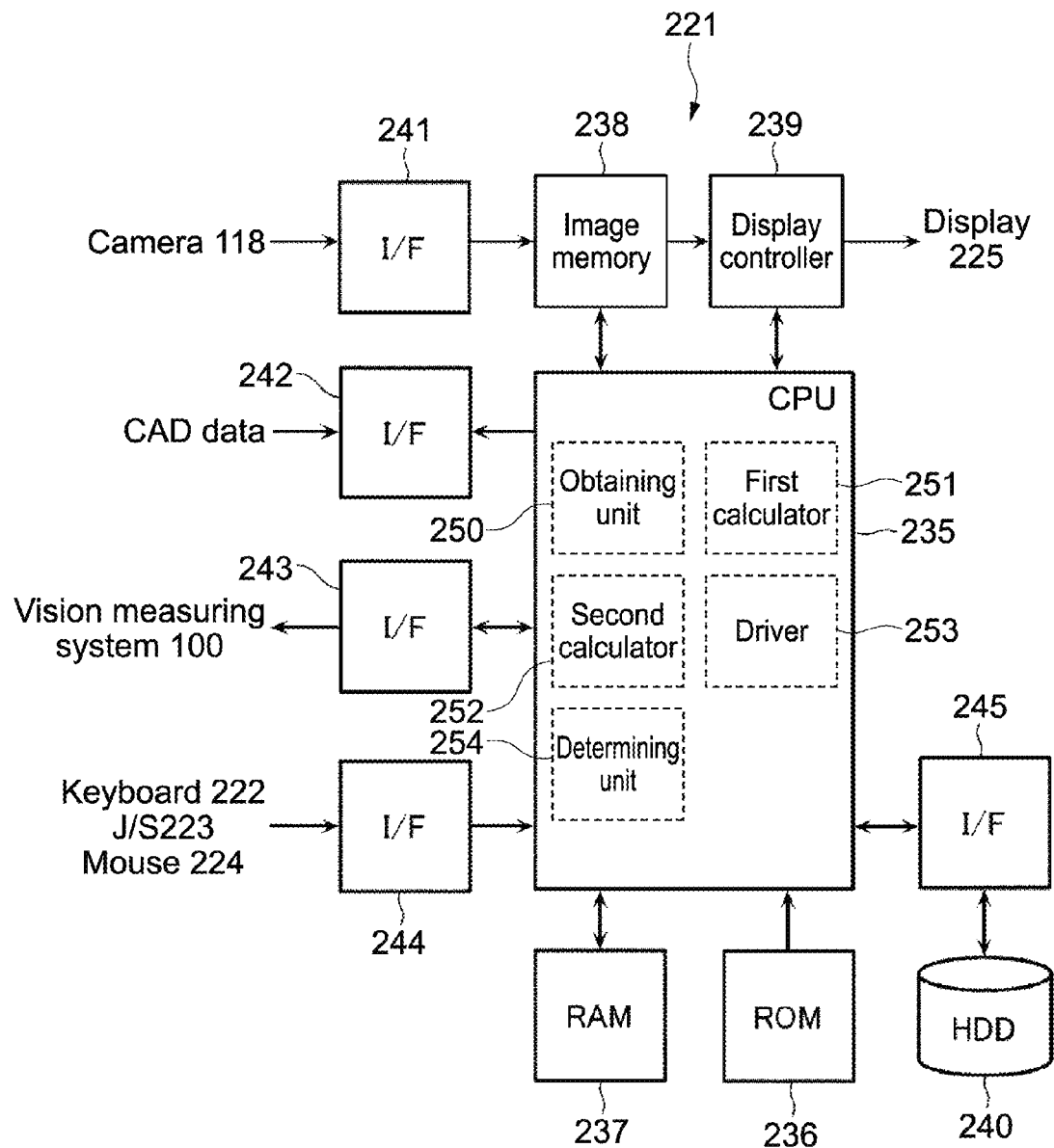
FIG. 2 is a block diagram schematically showing an example of the configuration of a main PC of FIG. 1.

FIG. 2 is a block diagram schematically showing an example of the configuration of the main PC 221. The main PC 221 includes a CPU (Central Processing Unit) 235, a ROM (Read Only Member) 236, a RAM (Random Access Memory) 237, an image memory 238, and a display controller 239. Further, the main PC 221 includes various I/Fs (interfaces) 241 to 245. The vision measuring system 100, the keyboard 222, a HDD (Hard Disk Drive) 240, or the like connect to each of the I/Fs 241 to 245.

The camera 118 takes an object image of the work 3. The camera 118 transfers/inputs information on the object image to/in the image memory 238 via the I/F 241.

The image memory 238 stores the information on the object image as a multivalued image. The image information is transferred via a USE cable and a USB port for example. The USE cable is a general-purpose digital serial communication wire.

In some cases, offline teaching is executed based on CAD (Computer Aided Design) data. In this case, a CAD system (not shown) generates CAD data of the work 3.

The CAD data is input in the CPU 235 via the I/F 242. For example the CPU 235 develops the CAD data input in the CPU 235 into image information such as bitmap. Then, the image memory 238 stores the image information.

The display controller 239 displays image information stored in the image memory 238 on the display 225.

The keyboard 222, the J/S 223, and the mouse 224 input code information, position information, and the like. The code information, position information, and the like are input in the CPU 235 via the I/F 244. The ROM 236 stores a macro program. The RAM 237 stores various programs obtained from the HDD 240 via the I/F 245. The CPU 235 executes measurement, displays measurement results, and the like based on the macro program and the various programs. The various programs include for example a measuring program, a measurement result display program, and the like. The various programs further include a program for executing the information processing method of the present disclosure.

The CPU 235 is capable of driving and controlling the vision measuring system 100 via the I/F 243 based on the measuring process. For example, a user operates the J/S 223 or the mouse 224 to input information. The X-axis driver mechanism and the Y-axis driver mechanism of the vision measuring system 100 are controlled based on the input information. As a result, the stage 112 and the image pickup unit 114 relatively move in the X-axis direction and the Y-axis direction.

After the stage 112 and the image pickup unit 114 move and settle, the Z-axis driver mechanism is controlled manually or automatically. As a result, the camera 118 moves in the Z-axis direction. Then the focal position is determined at a focus position that is in focus. An image of the work 3 in focus is taken.

Then the object image of the work 3 in a new image pickup area is displayed on the display 225. How to calculate the focus position will be described in detail later.

Note that the HDD 240 is a storage medium configured to store the various programs, data, and the like. The RAM 237 stores various programs, and supplies a work area for various kinds of processing to the CPU 235. In this embodiment, the HDD 240, the ROM 236, the RAM 237, and the like function as storage. Note that the program may be installed in the PC 200 via a network such as the Internet.

Further, the PC 200 is capable of sending for example a signal specifying the frame rate of the camera 118, a signal specifying the light intensity of a lighting device (not shown), and the like. The lighting device irradiates the work 3 with light. The camera 118 takes an image of the work 3 at a frame rate specified by the PC 200. As described above, image information on the taken image is bulk-transferred to the PC 200 via a USB cable or the like. In this case, a position controller (not shown) or the like of the vision measuring system 100 may send the position information on the camera 118 to the PC 200. Note that any one of various illuminators may be used as the lighting device. For example a PWM (Pulse Width Modulation)-controlled LED (Light Emitting Diode) or the like may be used.

In this embodiment, the position of the camera 118 moves to move the focal position. However, the way to move the focal position is not limited to this. For example, an optical system of the camera 118 including a lens and the like may be adjusted to move a focal position. If a digital microscope is used as the vision measuring system 100, the optical system of the optical microscope may be adjusted (objective lens may be moved, for example) to move a focal position. In other words, a method of moving a focal position of an object image is not limited, and a configuration therefor is not limited.

As schematically shown in FIG. 2, in this embodiment, the CPU 235 operates based on predetermined programs, and implements an obtaining unit 250, a first calculator 251, a second calculator 252, a driver 253, and a determining unit 254. Those blocks execute the following information processing method of this embodiment. In other words, the software stored in the HDD 240 and the like and the hardware resources of the PC 200 cooperate and implement the information processing of the PC 200. Note that dedicated hardware may be used to implement each block such as the obtaining unit 250.

[Operation of Vision Measuring Apparatus]

An operation (calculation of focus position) of the vision measuring apparatus 300 of this embodiment will be described. FIG. 3 to FIG. 8 are diagrams illustrating movement of the camera 118 in the Z-axis direction and calculation of the focus position based on the movement. In the following description, movement of the camera 118 in the Z-axis direction corresponds to movement of the focal position. Further, the movable range of the camera 118 corresponds to the movable range of the focal position.

Figure 3:
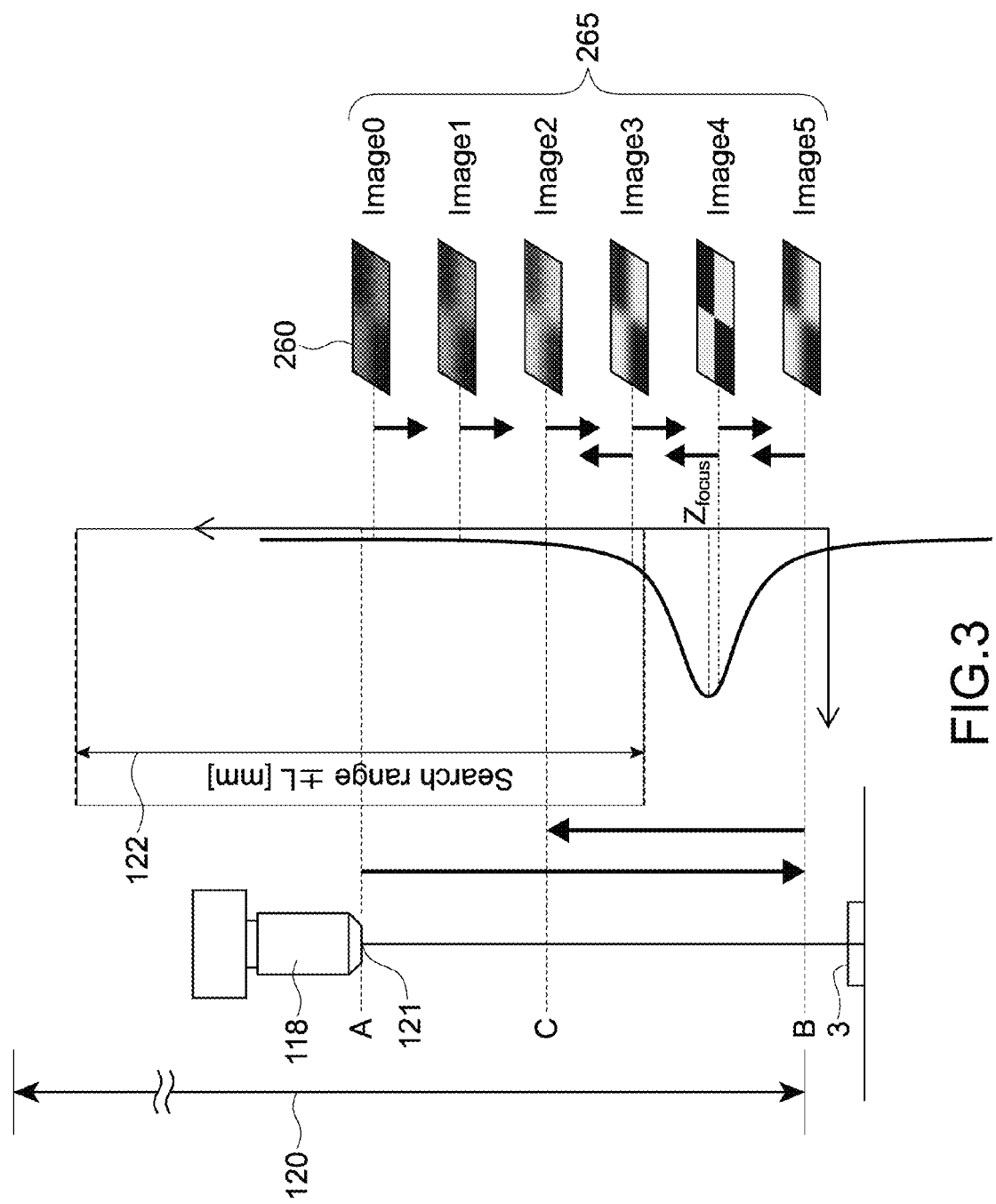
FIG. 3 is a diagram illustrating the way to manually adjust the position of a search range.

As shown in FIG. 3, the camera 118 is capable of moving within a movable range 120, i.e., a predetermined range. Further, a search range 122 is set with reference to the position 121 of the camera 118. During AF, the camera 118 searches the search range 122 for a focus position. In other words, if an AF instruction is input by a user, the camera 118 moves within the search range 122 automatically to search for a focus position.

In this embodiment, the set search range 122 has a predetermined distance from the position 121 of the camera 118 in the upward direction and a predetermined distance from the position 121 of the camera 118 in the downward direction. In other words, the search range 122 having the length ±L mm is set, where the positive (+) direction is the upward direction along the Z axis.

The distance of the search range 122 (length of L mm) may be set arbitrarily based on the focus depth and the like. The camera 118 moves in the Z-axis direction, and as a result the search range 122 is moved.

A user moves the position 121 of the camera 118 manually (by operating a mouse or the like) such that the search range 122 may include the focus position. In other words, a user manually moves the camera 118 to the AF start position. A user confirms an object image taken by the camera 118 on the display 225, and moves the camera 118 toward the focus position at the same time.

For example as shown in FIG. 3, the focus position Z_focus is at a predetermined position in the Z-axis direction. Then a user downward moves the camera 118 from a position A, which is above the focus position Z_focus. The user moves the camera 118 from the position A to a position B, which is below the focus position Z_focus. Then the user again moves upward from the position B toward the focus position Z_focus. Then the user moves the camera 118 to a position C, which is above the focus position Z_focus. In this manner the position 121 of the camera 118 is manually set at the AF start position (position C).

In this embodiment, when the position 121 of the camera 118 is being adjusted manually, the camera 118 takes a plurality of object images 260 while moving the position 121 of the camera 118 within the movable range 120. The obtaining unit 250 obtains the plurality of object images 260. The plurality of object images 260 correspond to "the plurality of object images taken while manually moving the focal position within the predetermined range".

Figure 4:
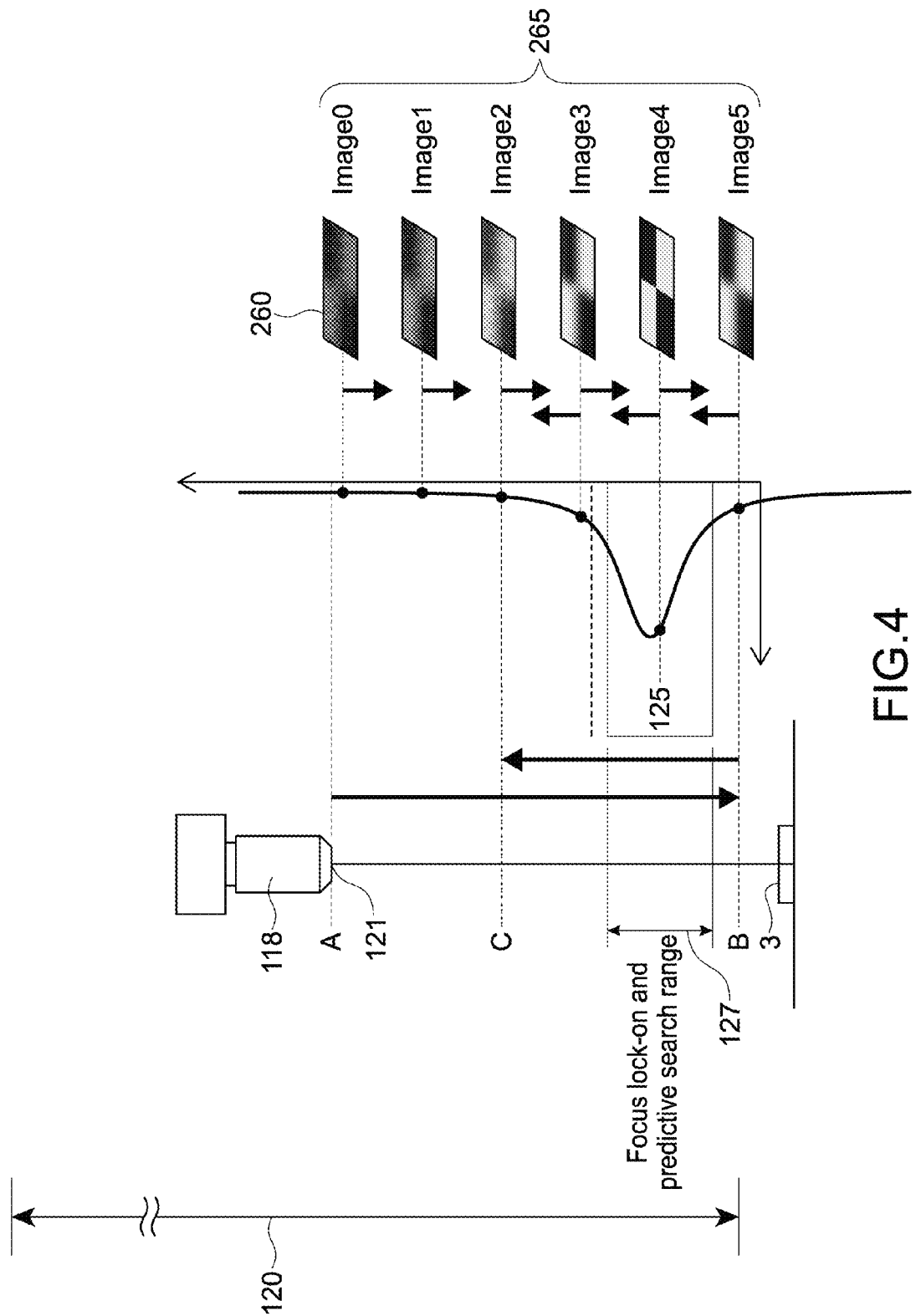
FIG. 4 is a diagram illustrating the way to set a first in-focus position and a predictive search range.

A manually-taken object image group 265 includes the plurality of object images 260 taken while manually adjusting the position 121 of the camera 118. In the examples of FIG. 3 and FIG. 4, the manually-taken object image group 265 includes the object images 260, i.e., Image0 to Image5.

In this embodiment, predictive AF is performed for the manually-taken object image group 265. In the predictive AF, the first calculator 251 calculates the first in-focus position 125 (focus lock-on) in the movable range 120 based on pieces of contrast information on the manually-taken object image group 265.

In this embodiment, every time the image pickup unit 114 inputs the object image 260, continuous predictive AF is performed, and the first in-focus position 125 is searched for. Specifically, in the example of FIG. 4, when the object image 260 (Image0) taken at the position A is input, predictive AF is started. Then when the object image 260 (Image5) taken at the position B, which is below the focus position Z_focus, is input, the first in-focus position 125 is calculated. The first in-focus position 125 is calculated based on a contrast peak value or the like (described later).

Note that predictive AF may be continuously performed for the object images 260, which are taken when the camera 118 moves from the position B to the position C. For example, when the taken object images 260 (Image5 to Image3), which are below and above the focus position Z_focus, are input, the first in-focus position 125 may be calculated again. As described above, continuous predictive AF may be performed every time the object image 260 is input. Alternatively, predictive AF may be finished when the first in-focus position is calculated for example. If the continuous predictive AF is performed, then it is possible to calculate the first in-focus position with a high degree of accuracy. Meanwhile, if the predictive AF is finished in progress, then the calculation amount and the processing time may be reduced.

When the manually-taken object image group 265 is obtained to perform predictive AF, the contrast values of the images 260 are calculated. The contrast value is an evaluated contrast value calculated based on contrast information on each image 260. The contrast value is calculated based on brightness values of the pixels of the object image 260. The method of calculating a contrast value is not limited. For example, a contrast value may be calculated based on the sum of the differences of the brightness values of adjacent pixels. Alternatively, a contrast value may be calculated based on the sum of the absolute values of brightness values, based on the frequency components of the object image 260, or the like. Alternatively, a contrast value may be calculated based on any arbitrary method. Note that it is not necessary to use all the pieces of information on the brightness values of all the pixels. Alternatively, some pieces of data may be used.

The first in-focus position 125 is calculated based on the calculated contrast values. In this embodiment, the contrast peak value in the movable range 120 is calculated based on the contrast values. Then the position (focal position) of the camera 118 corresponding to the contrast peak value is calculated as the first in-focus position. The first in-focus position 125 is considered as an approximate focus position Z_focus.

For example the contrast value of the object image 260 having the highest contrast value is used as the contrast peak value. In other words, the highest contrast value is calculated as the contrast peak value, out of the calculated contrast values of the object images 260. In this case, the position 121 of the camera 118 when the camera 118 takes the object image 260 having the highest contrast value is calculated as the first in-focus position 125. When calculating the first in-focus position 125, it may be determined if object images 260 having lower contrast values are taken or not before or after the object image 260 having the highest contrast value is taken. The first in-focus position 125 may be calculated only if object images 260 having lower contrast values are taken before or after the object image 260 having the highest contrast value is taken.

In the example of FIG. 4, when the object images 260 (Image0 to Image5) are obtained, the contrast value of the object image 260 (Image4) is calculated as the contrast peak value. Then the position 121 of the camera 118 when the camera 118 takes the object image 260 (Image4) is calculated as the first in-focus position 125. Note that when the first in-focus position 125 is calculated again while the camera 118 moves from the position B to the position C, the similar process may also be executed.

Alternatively, model function fitting may be performed to calculate the contrast peak value. Based on the model function fitting, a function showing the relation between the focal position within the movable range 120 and the contrast values is calculated. Then the peak value of the function may be calculated as the contrast peak value. For example, Gaussian function fitting using the method of least squares or the like may be used as the model function fitting. Alternatively, another function fitting may be used.

If the first in-focus position 125 is calculated, then a predictive search range 127 is set with reference to the calculated first in-focus position 125.

The set predictive search range 127 has predetermined distances in the upward and downward directions from the first in-focus position 125, i.e., the center. In other words, the predictive search range 127 having the length ±N mm is set, where the positive (+) direction is the upward direction along the Z axis.

The distance of the predictive search range 127 (length of N mm) may be set arbitrarily based on the focus depth and the like. For example if an optical system has a smaller focus depth, the focus position Z_focus is near the first in-focus position 125. So in this case, a smaller predictive search range 127 is set.

For example if an optical system has a larger focus depth, the focus position Z_focus is within a relatively larger range. So a larger predictive search range 127 is set.

As described above, in this embodiment, predictive AF is performed when a user adjusts the focal position manually. Then the first in-focus position 125 and the predictive search range 127 are set. A user finishes adjusting the focal position, and the position 121 of the camera 118 moves to the AF start position. Then, the user inputs an AF instruction. Alternatively, the contrast values of the object images 260 may be monitored always, and the first in-focus position 125 and the predictive search range 127 may be set when an AF instruction is input.

Figure 5:
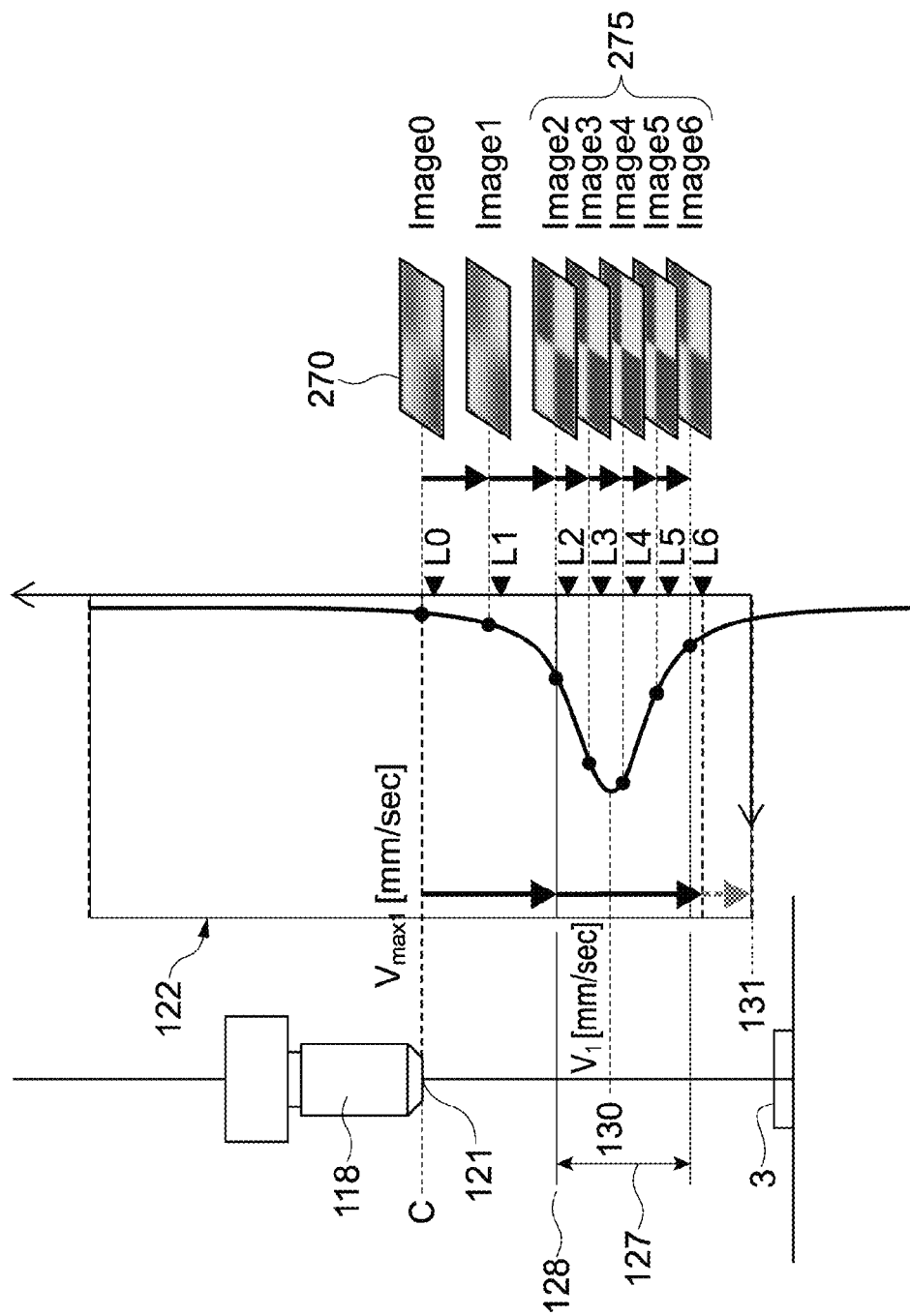
FIG. 5 is a diagram illustrating an AF operation of this embodiment.

As shown in FIG. 5, if the AF instruction is input, the driver 253 moves the position 121 of the camera 118 to a start position 128 of the predictive search range 127 at a first velocity Vmax1, i.e., a high velocity. The start position 128 of the predictive search range 127 is one of the end points of the predictive search range 127. Typically the end point closer to the position 121 of the camera 118 when the AF instruction is input is set as the start position 128 of the predictive search range 127.

Then the driver 253 moves the position 121 of the camera 118 within the predictive search range 127 at a second velocity V1 lower than the first velocity. If a search is performed at the second velocity V1, i.e., a lower velocity, it is possible to calculate the focus position Z_focus with a high degree of accuracy. Note that the first velocity Vmax1 and the second velocity V1 may be set arbitrarily based on the focus depth or the like.

To search the predictive search range 127, the camera 118 takes a plurality of object images 270 while moving the position 121 of the camera 118 automatically within the predictive search range 127, which is set with reference to the first in-focus position 125. The obtaining unit 250 obtains the plurality of object images 270. The plurality of object images 270 corresponds to "the plurality of object images taken while automatically moving the focal position within a search range, the search range being determined with reference to the calculated first in-focus position".

An automatically-taken object image group 275 includes the plurality of object images 270, which are taken when AF is performed. In the example of FIG. 5, the automatically-taken object image group 275 includes the object images 270 (Image2 to Image6). Note that the object images 270 (Image0 and Image1) may be used to calculate the focus position Z_focus.

The second calculator 252 calculates a second in-focus position 130 in the predictive search range 127 based on the pieces of contrast information on the automatically-taken object image group 275. In other words, the contrast peak value is calculated based on the pieces of contrast information on the automatically-taken object image group 275. Then the position 121 of the camera 118 corresponding to the contrast peak value is calculated as the second in-focus position. The second in-focus position 130 is calculated as the focus position Z_focus.

A method of calculating contrast values and a method of calculating a peak value are not limited. The above-mentioned methods or the like may be used arbitrarily. Typically model function fitting is performed to calculate the second in-focus position 130, and the peak value of the function is used. As a matter of course the position 121 of the camera 118 when the camera 118 takes the object image 270 having the highest contrast value may be calculated as the second in-focus position 130.

In the example of FIG. 5, the contrast peak value is calculated when the object image 270 (Image6) is taken. Then movement of the camera 118 is stopped when the object image 270 (Image6) is taken. Note that movement of the camera 118 may be stopped when the peak value is calculated. As a result it is possible to reduce the processing time. For example movement of the camera 118 is stopped when contrast values are calculated, where the number of the contrast values is enough to calculate a parameter of a model function.

As described above, according to the PC 200 of this embodiment, the camera 118 takes the manually-taken object image group 265 while a user moves the position (focal position) of the camera 118 manually. The first in-focus position 125 is calculated based on the pieces of contrast information on the manually-taken object image group 265. The predictive search range 127 is set with reference to the first in-focus position 125. The camera 118 takes the automatically-taken object image group 275 while the position 121 of the camera 118 moves automatically. Then the second in-focus position 130 is calculated based on the automatically-taken object image group 275. As a result, it is possible to sufficiently prevent needless scanning from occurring when the position of the camera 118 moves automatically (scanning). It is possible to calculate the focus position Z_focus at a high velocity.

Further the AF instruction is input after the first in-focus position 125 is calculated and the predictive search range 127 is set. So it is possible to reduce the time for AF sufficiently.

Further in AF, the camera 118 moves to the start position 128 of the predictive search range 127 at a higher velocity. The predictive search range 127 is scanned automatically at a lower velocity. As a result, it is possible to calculate the focus position Z_focus at a high velocity or with a high degree of accuracy. Further the start position 128 of the predictive search range 127 is calculated. So the direction in which the camera 118 moves first in AF, which is in response to an instruction from a user, is determined. As a result, it is possible to sufficiently prevent the camera 118 from moving first in the direction in which the focus position Z_focus does not exist. Because of this, also, it is possible to calculate the focus position at a high velocity.

Note that the predictive search range 127 with reference to the first in-focus position 125 may not be the range having a predetermined length including the first in-focus position 125 at the center.

Alternatively, the range between the start position 128 of the predictive search range 127 and the end point (lowermost end 131 in example of FIG. 5) of the search range 122 at the opposite side may be set as the predictive search range 127.

Specifically, first, a range (corresponding to predictive search range 127 of this embodiment) having a predetermined length is set, where the center of the range is the first in-focus position 125. One of the end points is set as the start position 128 of the predictive search range 127. Then a range between the start position 128 and an end point of the search range 122 at the opposite side may be set as the predictive search range. As a result, it is possible to scan a wider range, and to calculate the focus position Z_focus with a high degree of accuracy. Also in this case, the direction in which the camera 118 moves first is determined. So it is possible to calculate the focus position Z_focus at a high velocity. Further, in most cases, the focus position Z_focus is calculated in the vicinity of the first in-focus position 125, before the camera 118 reaches the end point of the search range 122 at the opposite side.

Figure 6:
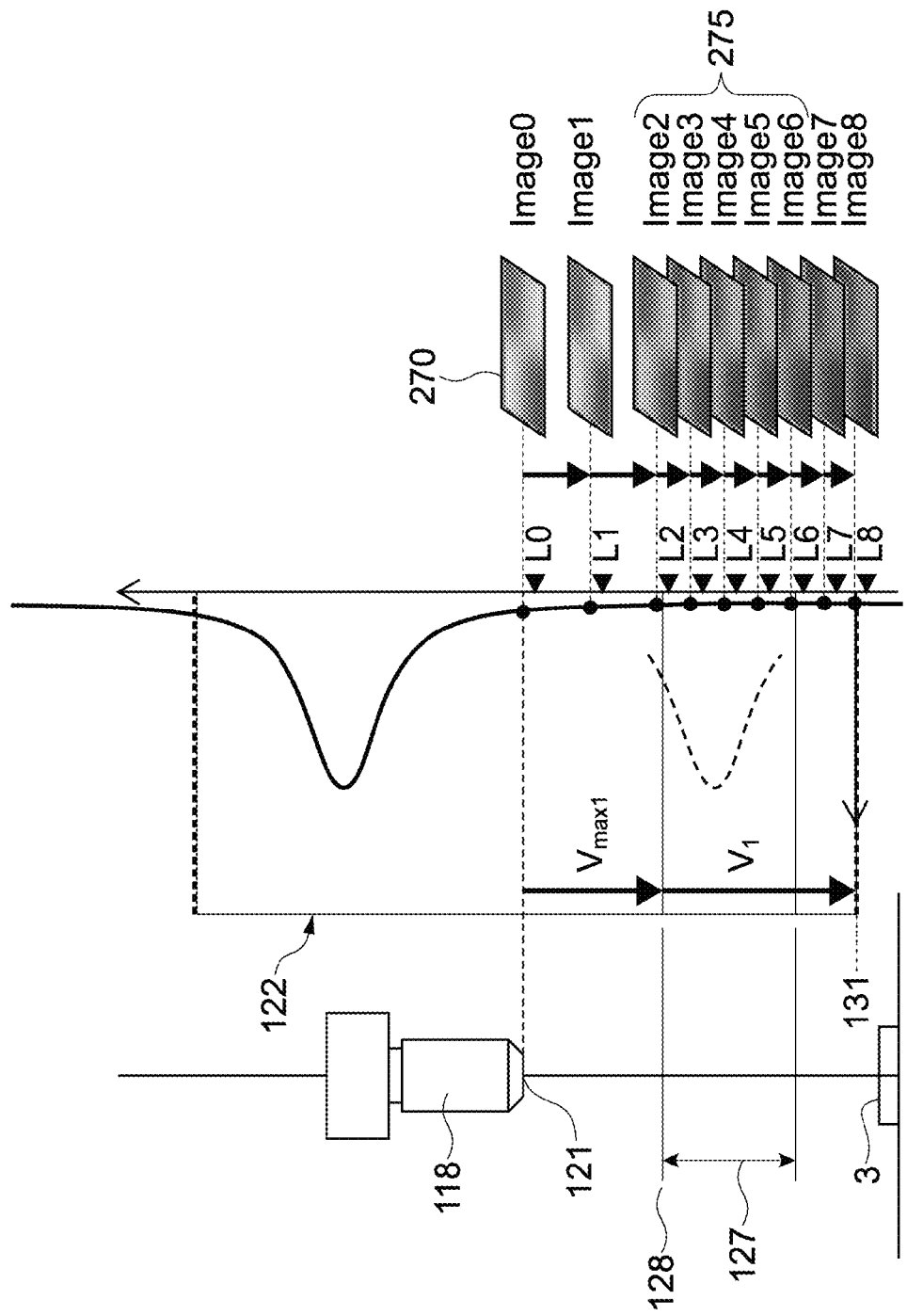
FIG. 6 is a diagram illustrating an operation when a focus position does not exist in a predictive search range.
Figure 7:
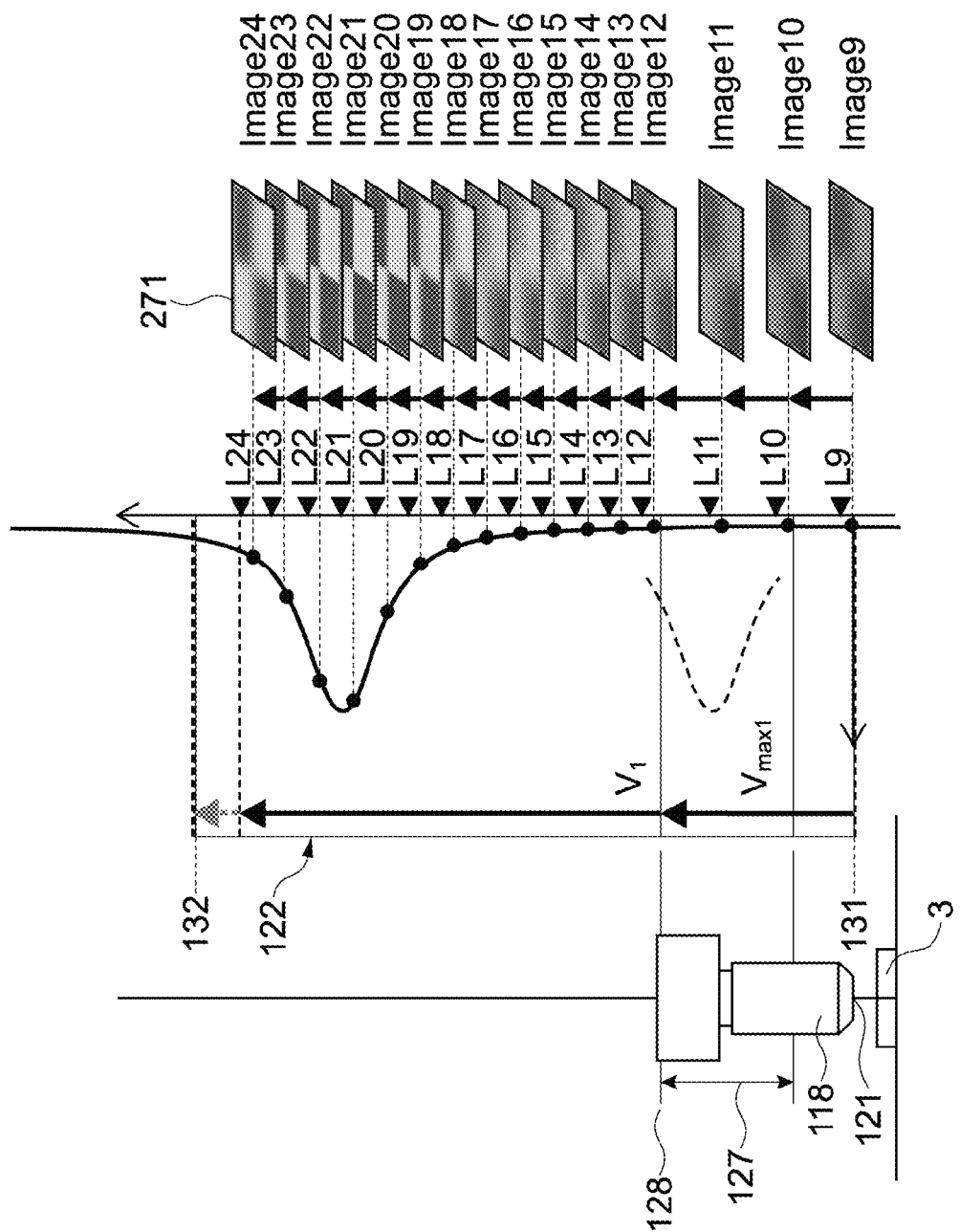
FIG. 7 is a diagram illustrating the operation when a focus position does not exist in a predictive search range.

With reference to FIG. 6 and FIG. 7, a case where the focus position Z_focus is not detected within the predictive search range 127 will be described. For example the work 3 is replaced or displaced after the predictive search range 127 is set and before an AF instruction is input. Alternatively, an image pickup condition is changed (e.g., lighting intensity is changed). In this case, the focus position Z_focus is changed. As a result, the focus position Z_focus does not exist in the predictive search range 127, which is set before an image pickup condition is changed.

As shown in FIG. 6, if an AF instruction is input, the camera 118 moves to the start position 128 of the predictive search range 127 at the first velocity Vmax1 (object images 270 (Image0 and Image1) are taken). Then the camera 118 moves within the predictive search range 127 at the second velocity V1 (object images 270 (Image2 to Image6) are taken). The focus position Z_focus does not exist in the predictive search range 127. Because of this, a contrast peak value is not calculated. For example if a threshold for calculating a contrast value is set arbitrarily and if a contrast value larger than the threshold is not calculated, a peak value is not calculated.

Because a peak value is not calculated in the predictive search range 127, the predictive search range 127 is searched at the second velocity V1 until the lowermost end 131 is searched. In the example of FIG. 6, the focus position Z_focus does not exist in the predictive search range 127. So the camera 118 moves to the lowermost end 131 and then stops. Note that the camera 118 may stop at the lowermost end of the predictive search range 127. However, if the camera 118 continuously moves to the lowermost end 131 of the search range 122, it is possible to calculate the focus position Z_focus efficiently.

As shown in FIG. 7, if a search is unsuccessful, the camera 118 moves at the first velocity Vmax1, and reaches the start position 128 of the predictive search range 127. Then the camera 118 moves at the second velocity V1 from the start position 128 to the uppermost end 132 of the search range 122. The camera 118 takes object images 271 (Image12 to Image24) at that time. The contrast peak value is calculated based on the pieces of contrast information on the object images 271 (Image12 to Image24).

In the example of FIG. 7, when the object image 271 (Image24) is taken, the contrast peak value is calculated. Then the focus position Z_focus is calculated. Movement of the camera 118 is interrupted before the camera 118 reaches the uppermost end 132 of the search range 122 to reduce the processing time. Even if search within the predictive search range 127 is unsuccessful as described above, it is possible to perform AF successfully. Note that it is believed that a user rarely replaces a work and inputs an AF instruction after he adjusts the position 121 of the camera 118 manually. So the above-mentioned case is very rare.

In this embodiment, the determining unit 254 determines validity of the first in-focus position 125 such that the predictive search range 127 may be searched successfully. For example, if an AF instruction is not input within a predetermined period after the first in-focus position 125 is calculated, then it is determined that the first in-focus position 125 is invalid. As described above, the focus position Z_focus is changed because the work 3 is replaced or the like after the first in-focus position 125 is calculated in most cases. It is believed that a user inputs an AF instruction soon after he adjusts the position 121 of the camera 118 manually if the work 3 is not to be replaced or the like. In consideration of this, if a predetermined time period passes after the first in-focus position 125 is calculated, then it is determined that the work 3 is likely to be replaced or the like. In this case, it is determined that the first in-focus position 125 is invalid. As a result, it is possible to prevent needless search from occurring. Note that a predetermined time period may be set as necessary.

Figure 8:
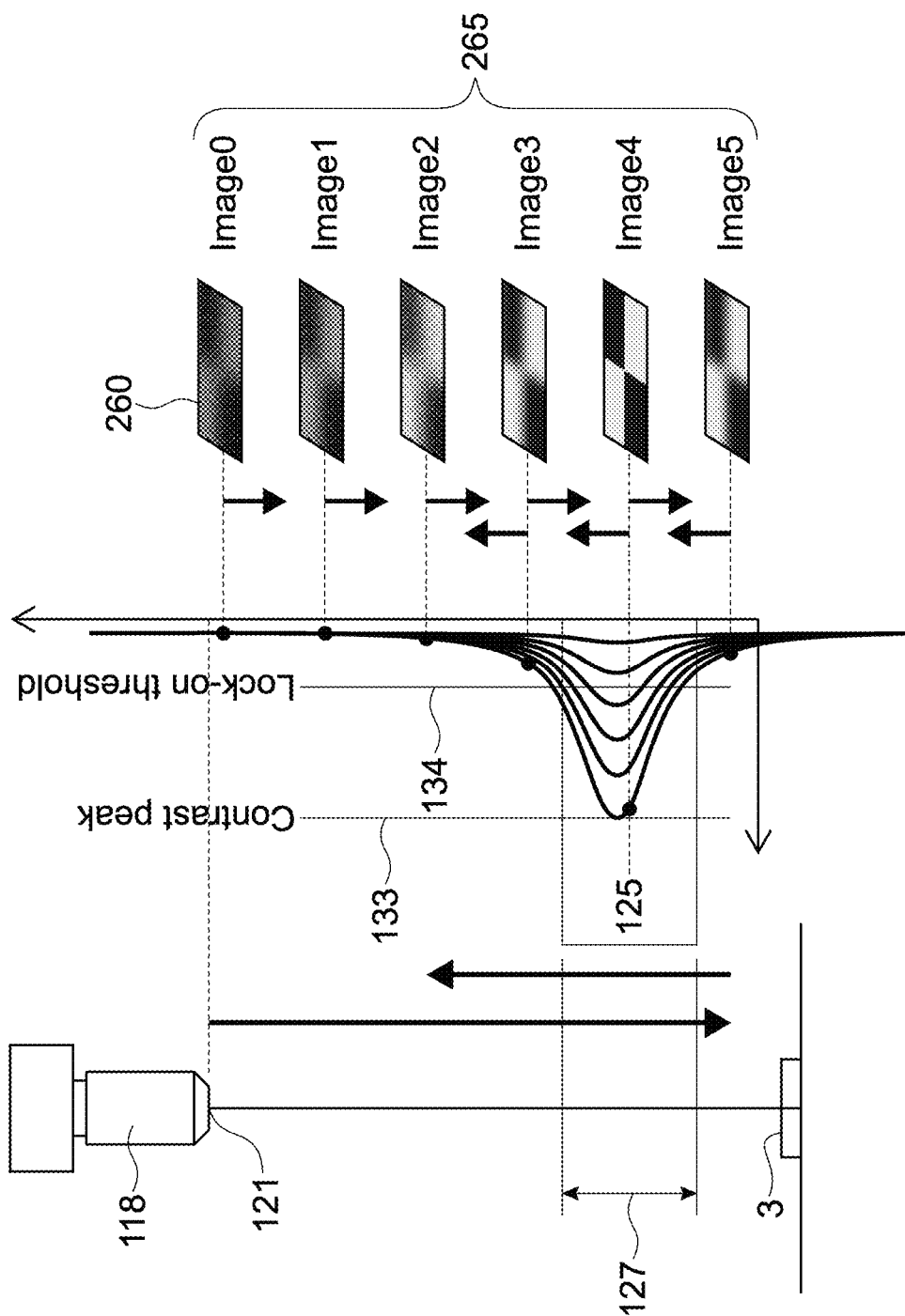
FIG. 8 is a diagram illustrating an example of a method of determining validity of a first in-focus position.

The predetermined time period may be set based on the contrast peak value 133 as shown in FIG. 8. Specifically, the contrast peak value 133 is attenuated at a predetermined rate. The attenuated peak value 133 falls below a predetermined threshold, i.e., the lock-on threshold 134. At this time, it is determined that the first in-focus position 125 is invalid. The contrast peak value 133 may be the peak value of a fitting function or the largest contrast value.

In other words, in the example of FIG. 8, a time period until the peak value 133 falls below the lock-on threshold 134 is set as the predetermined time period. A predetermined rate and the lock-on threshold 134 may be set as necessary. For example the predetermined rate may be the frame rate or the like. Further the lock-on threshold 134 may be determined with reference to the peak value 133. For example, the lock-on threshold 134 may be the half of the peak value 133 or the like.

The peak value 133, which is attenuated at a predetermined rate, may be used as a parameter showing reliability of the first in-focus position 125. For example reliability of the first in-focus position 125 is determined based on the peak value 133 larger than the lock-on threshold 134. Then any process may be performed based on the reliability of the first in-focus position 125. For example the main PC 221 may inform a user of reliability information. The display 225 may display a GUI (Graphical User Interface) requiring confirmation of execution of AF, and the like.

If the first in-focus position 125 is invalid, then the position 121 of the camera 118 is adjusted again manually. At this time, the first in-focus position 125 and the predictive search range 127 are set again when the camera 118 passes through the focus position Z_focus.

The first in-focus position 125 is calculated based on the pieces of contrast information on the manually-taken object image group 265. Next, an example of the way to calculate the first in-focus position 125 will be described in detail. FIG. 9 and FIG. 10 are pictures and diagrams schematically illustrating the example of calculating the first in-focus position 125.

Figure 9A:
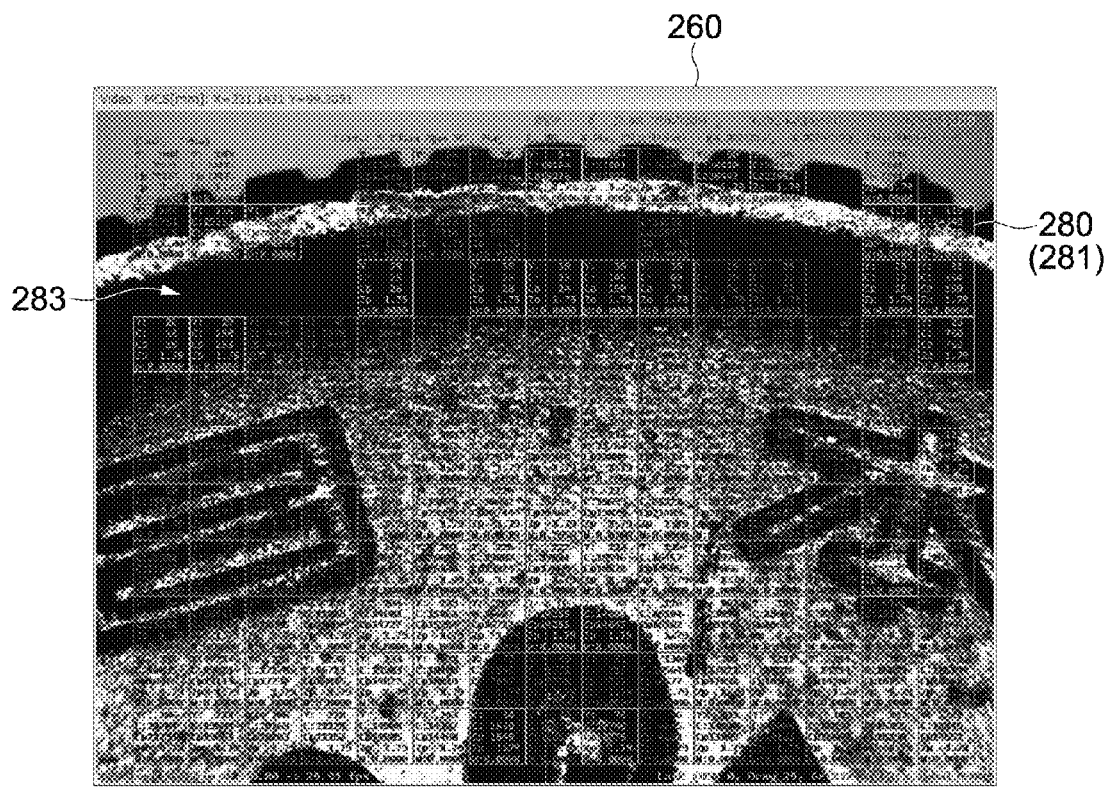
FIGS. 9A and 9B are a photograph and a diagram schematically illustrating the way to calculate first in-focus positions based on pieces of contrast information on a manually-taken object image group.
Figure 9B:
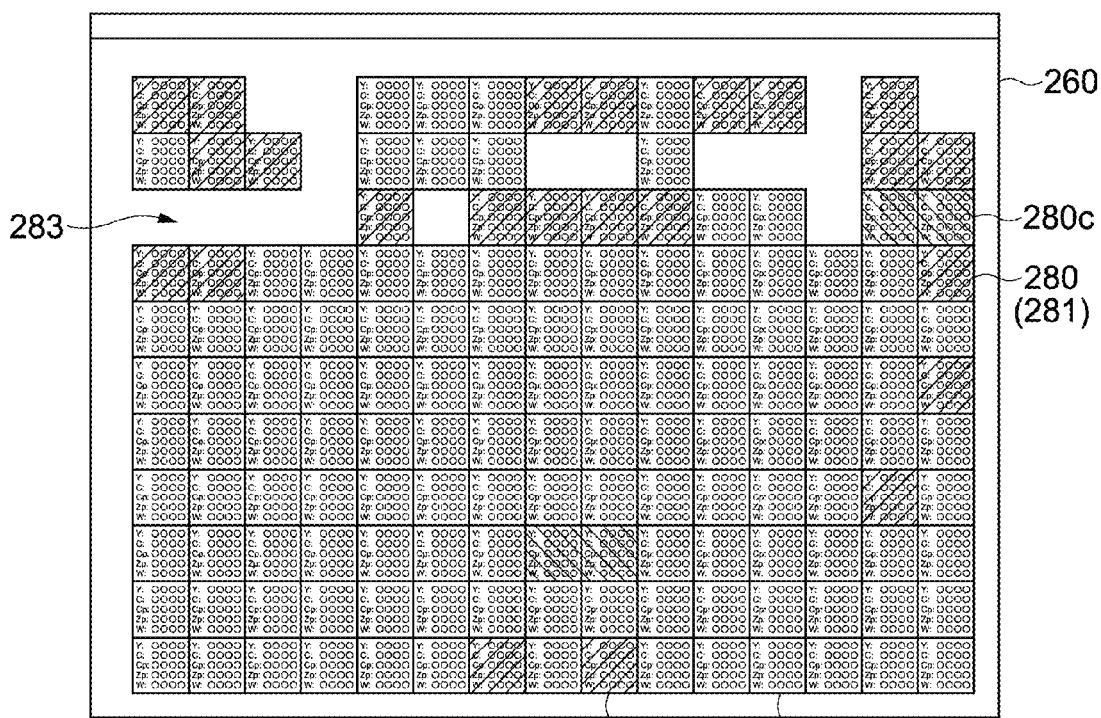
Figure 10A:
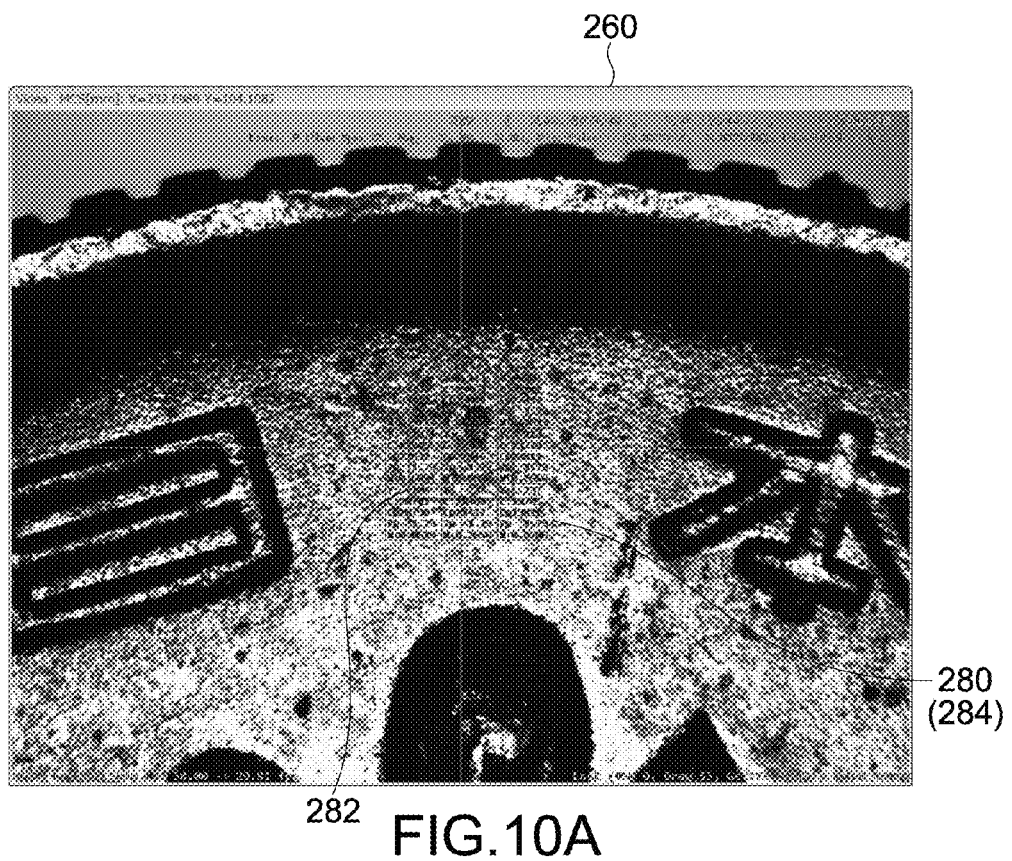
FIGS. 10A and 10B are a photograph and a diagram schematically illustrating the way to calculate first in-focus positions based on pieces of contrast information on a manually-taken object image group.
Figure 10B:
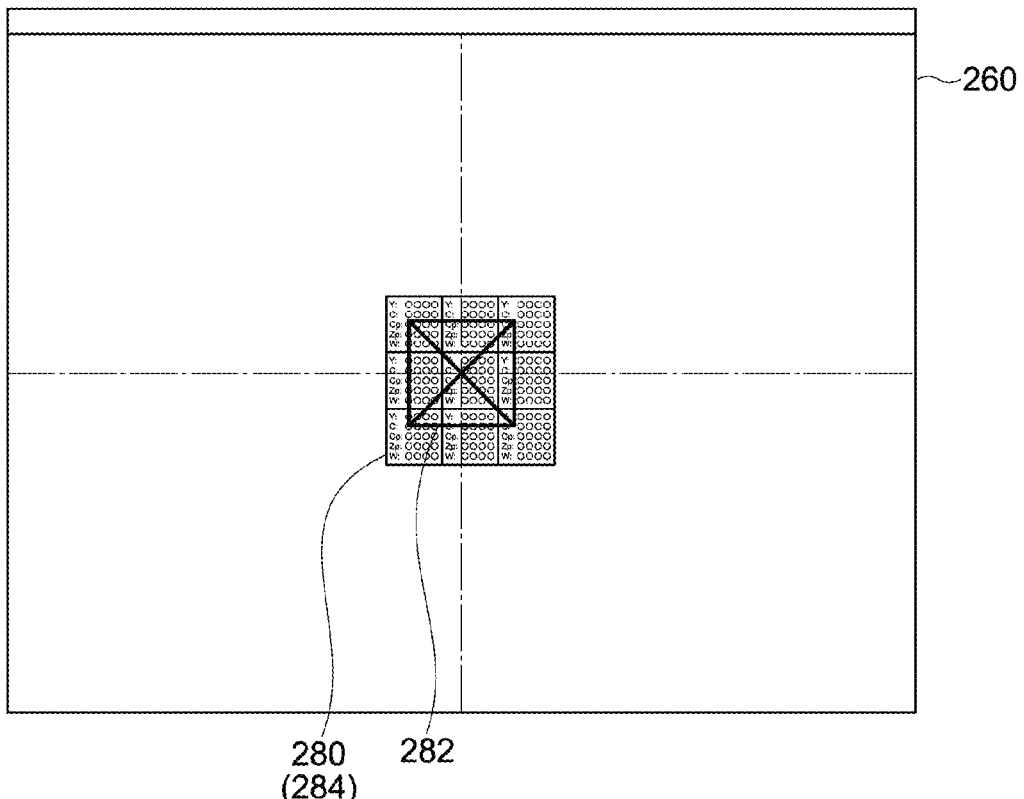

As shown in the photograph of FIG. 9A and the diagram of FIG. 9B, in this embodiment, the object image 260 is divided, and a plurality of divided areas 280 are set. Divided-area in-focus positions and the like are calculated based on the pieces of contrast information on the plurality of divided areas 280. The divided-area in-focus position is the first in-focus position of each divided area 280. Then information on each divided area 280 is stored in storage. The information on each divided area 280 includes the divided-area in-focus position and the like. Information (hereinafter referred to as divided-area information) stored for each divided area 280 is used as necessary to calculate the first in-focus position 125 of the entire object image 260.

For example in the example of FIG. 9, divided-area information is displayed in a cell 281 showing each divided area 280. The cell 281 shows the following pieces of information.

Y . . . Brightness of the divided area 280 when the camera is at the current Z position (focal position) (average value of brightness of all pixels of divided area 280. Represented by 256 tones/8 bits for example).

C . . . Contrast value of the divided area 280 when the camera is at the current Z position (focal position).

Cp . . . Largest contrast value of the divided area 280 until now.

Zp . . . Z position (focal position) of the camera when the camera takes an image including the divided area 280 having the largest contrast value Cp. The value Zc in the formula of the paragraph [0111] is used.

W . . . Weighting coefficient (described later) determined based on the size of an area overlapping with a reference area 282 of FIG. 10.

For example those pieces of information are stored as divided-area information. Alternatively, other pieces of information may be stored as divided-area information (see FIG. 12).

In FIG. 9, no cell 281, which shows the divided area 280, is displayed on areas 283. It is not possible to calculate the above-mentioned divided-area information for the areas 283. For example the areas 283 have contrast values lower than a predetermined threshold (for example lock-on threshold of FIG. 8). Alternatively, for example, the camera 118 is yet to pass through Zp, and Cp and the like are not confirmed yet, whereby it is not possible to calculate divided-area information for the areas 283. Red cells are displayed in FIG. 9A for the divided areas 280a of FIG. 9B without hatching. The divided-area in-focus position of each divided area 280a is calculated, and the above-mentioned Zp is confirmed as the divided-area in-focus position.

Yellow cells are displayed in FIG. 9A for the diagonally-right-up-hatched divided areas 280b of FIG. 9B. It is determined that the divided-area in-focus position of each divided area 280b is not above the current Z position. In other words, it is determined that the divided-area in-focus position of each divided area 280b is not above Zp, but may be below Zp. In other words, the divided-area in-focus position of each divided area 280b is yet to be determined.

Blue cells are displayed in FIG. 9A for the diagonally-left-up-hatched divided areas 280c of FIG. 9B. It is determined that the divided-area in-focus position of each divided area 280c is not below the current Z position. In other words, it is determined that the divided-area in-focus position of each divided area 280c is not below Zp, but may be above Zp. In other words, the divided-area in-focus position of each divided area 280c is yet to be determined.

The divided-area in-focus position of each red cell (divided area 280a) is determined. Information on the red cells (divided areas 280a) is used to calculate the first in-focus position 125 of the entire object image 260. Note that the colors are not limited to the above colors.

As shown in FIG. 10, in order to calculate the first in-focus position 125 of the entire object image 260, a reference area 282 is set in the object image 260. The first in-focus position 125 is to be calculated with reference to the reference area 282. Typically, the set reference area 282 is at the center of the object image 260, and has a predetermined size. The position of the reference area 282 is not limited to the center. Alternatively, the set reference area 282 may be at an arbitrary position in the camera view, and the reference area 282 may have an arbitrary size. The divided areas 280 overlapping with the reference area 282 are set as calculation-object areas 284. The first in-focus position 125 of the entire object image 260 is calculated based on the pieces of divided-area information on the calculation-object areas 284, each of which includes information on the divided-area in-focus position.

At this time, the calculation-object areas 284 are weighted based on the sizes of areas overlapping with the reference area 282, and based on the largest contrast values Cp, i.e., the pieces of contrast information on the calculation-object areas 284. As a result, it is possible to calculate the first in-focus position 125 with a high degree of accuracy. If the reference area 282 contains an entire cell, i.e., a calculation-object area 284, the weighting coefficient W of the cell is 1.0. If the reference area 282 contains part of a cell, W of the cell is a value between 0.0 and 1.0. If a cell is out of the reference area 282, W of the cell is 0.0. This cell is a divided area 280 other than the calculation-object areas 284. W may be displayed for debugging miscalculation of a weighting coefficient.

In FIG. 9 and FIG. 10, the divided areas 280 and the pieces of divided-area information are information for internal processing. In other words, the cells showing the divided areas 280 and the pieces of divided-area information are not in fact displayed on a display device. A user confirms an image, which shows no cells and no divided-area information, displayed on the display device. As a matter of course, those pieces of information may be displayed on a display device when a user operates the vision measuring apparatus 300. However, those pieces of information are used for debugging typically.

The divided-area information on each divided area 280 is updated when a user moves the position 121 of the camera 118 manually. Then the first in-focus position 125 and the predictive search range 127 are preset before an AF instruction is input. Alternatively, the divided-area information on each divided area 280 is updated when a user moves the position 121 of the camera 118 manually. Then the first in-focus position 125 and the predictive search range 127 may be set based on the divided-area information after an AF instruction is input. In any case, the camera-moving direction is set when AF is started, and it is possible to calculate the focus position Z_ focus at a high velocity.

Figure 11:
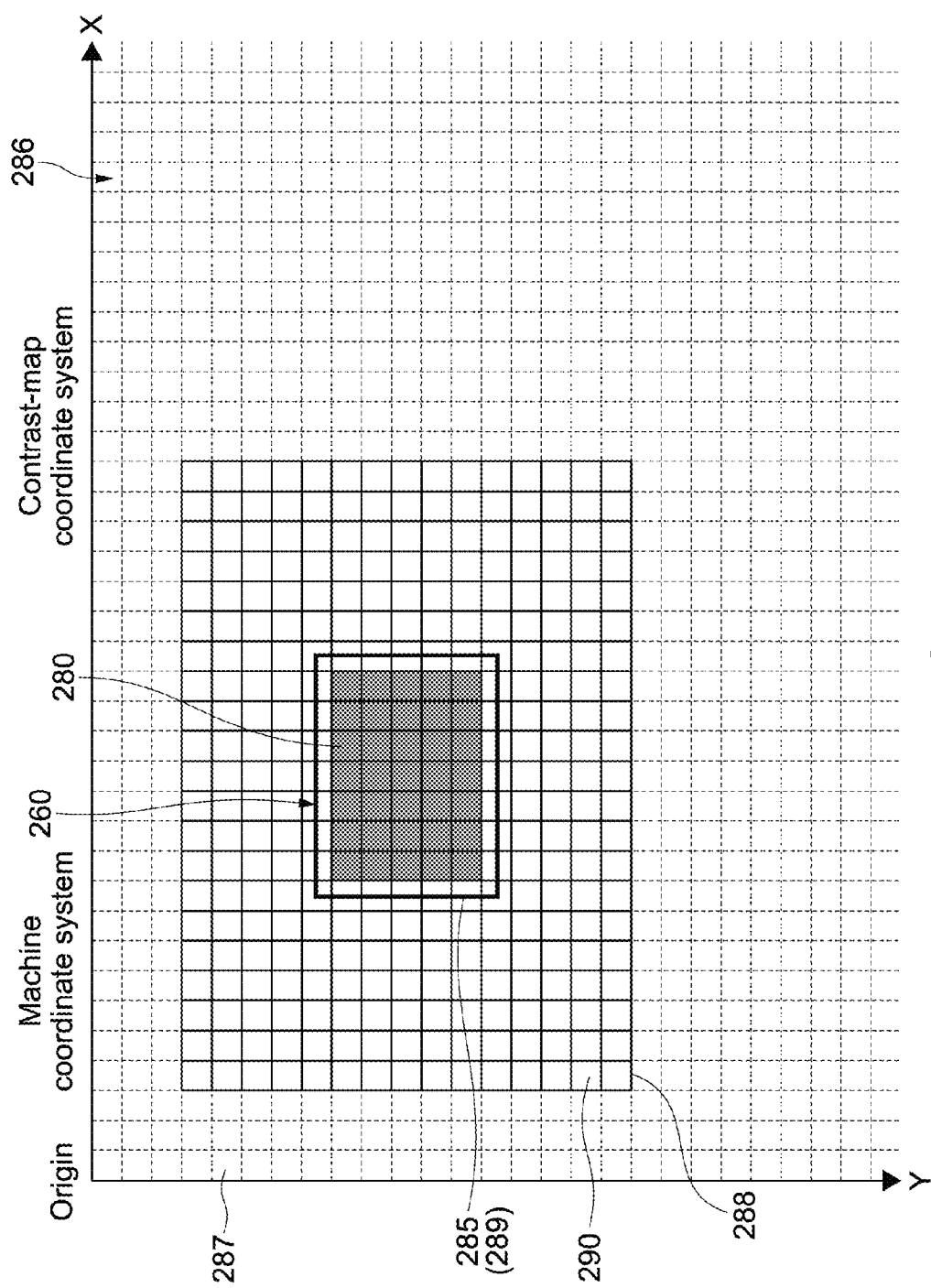
FIG. 11 is a diagram illustrating the way to set a plurality of divided areas.

FIG. 11 is a diagram illustrating the way to set the plurality of divided areas 280. As shown in FIG. 11, a machine coordinate system and a contrast-map coordinate system are stored in storage. The machine coordinate system shows the position of the stage 112 and the position of the image pickup unit 114. The coordinate of an image pickup position 285 is calculated based on the machine coordinate system. The machine coordinate system is set within a range including the movable range of the image pickup position 285. The coordinate of the machine coordinate system is represented in millimeters.

The origin, the X axis, and the Y axis of the machine coordinate system are same as the origin, the X axis, and the Y axis of the contrast-map coordinate system. As shown in FIG. 11, the range 286 of the machine coordinate system is divided in a grid, whereby a plurality of areas 287 are obtained. The contrast-map coordinate system is set up as a coordinate system showing the position coordinate of each area 287.

The contrast map 288 is set with reference to the contrast-map coordinate system. In this embodiment, the area of the set contrast map 288 is larger than the area of the image pickup area (camera view) 289. The contrast map 288 contains the image pickup area 289. In this embodiment, the contrast map 288 functions as a map-for-calculation.

The divided areas 280 are set up by dividing the object image 260 (image in image pickup area 289) such that the divided areas 280 may correspond to the plurality of areas 290 of the contrast map 288. In FIG. 11, the plurality of divided areas 280 are hatched (the number of the divided areas are smaller than that of FIG. 9 or the like). In view of this, the size of each of the plurality of areas 290 of the contrast map 288, i.e., the size of each of the plurality of areas 287 of the contrast-map coordinate system, is determined based on the approximate size of each divided area 280. For example the size of each divided area 280 is n×n (pixels). In this case, the contrast-map coordinate system and the contrast map 288 are set based on the size (n×n pixels).

In this embodiment, the pixel size of the taken object image 260 is known. So it is possible to calculate (calibrate) the length of the side of each divided area 280 in millimeters based on the pixel size.

The contrast-map coordinate system is set up in millimeters based on the calculated length in millimeters. In this embodiment, the size of the object image 260 is 2048×1538 (pixels). The size of the divided area 280, i.e., the cell 281, is 128×128 (pixels). The object image 260 and the divided areas 280 are mapped on the machine coordinate system in millimeters.

The size of the contrast map 288, which is larger than the image pickup area 289, is not limited. In this embodiment, the image pickup area 289 including the plurality of divided areas 280 (7×5 cells in FIG. 11) is enlarged in the eight directions by the same rate, whereby the contrast map 288 including 21×15 cells is set. Alternatively, a different contrast map may be set as necessary.

As described above, the plurality of divided areas 280 are set up with reference to the contrast map 288 stored in the storage. The above-mentioned divided-area information on each of the plurality of divided areas 280 is updated every time the object image 260 is transferred to the PC 200 for example. For example the divided-area information is updated every time the camera moves in the XYZ-axis directions.

Figure 12:
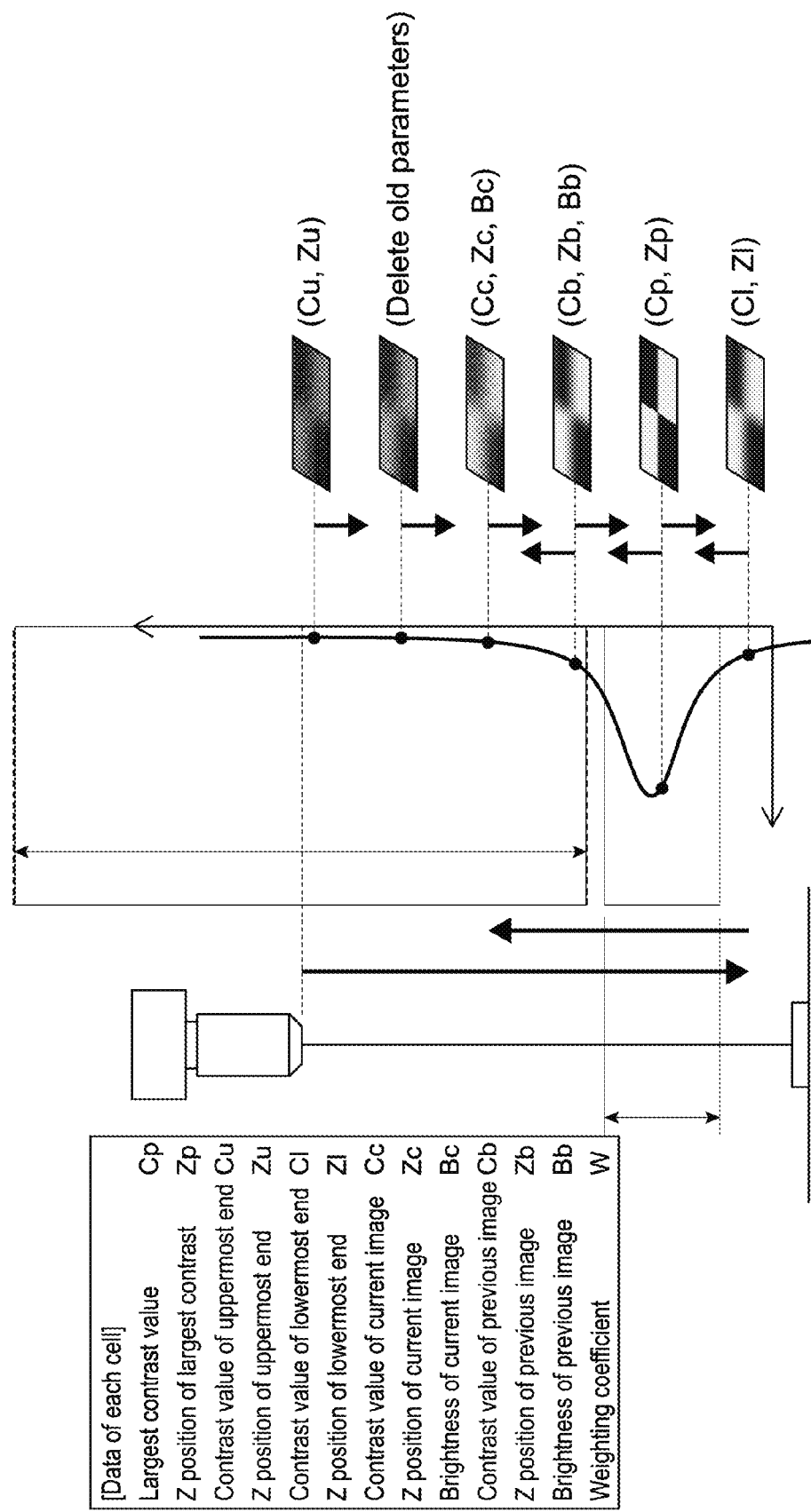
FIG. 12 is a diagram illustrating divided-area information.

FIG. 12 is a diagram illustrating divided-area information. In this embodiment, the following pieces of divided-area information are stored.

Cp . . . Largest contrast value.

Zp . . . Z position of the largest contrast.

Cu . . . Contrast value of the uppermost end of the range in which a user moves the camera manually until now.

Zu . . . Z position of the uppermost end of the range in which a user moves the camera manually until now.

Cl . . . Contrast value of the lowermost end of the range in which a user moves the camera manually until now.

Zl . . . Z position of the lowermost end of the range in which a user moves the camera manually until now.

Cc . . . Contrast value of the current image (corresponding to contrast value C in paragraph [0093]).

Zc . . . Z position of the current image.

Bc . . . Brightness of the current image (corresponding to brightness Y in paragraph [0093]).

Cb . . . Contrast value of the previous image.

Zb . . . Z position of the previous image.

Bb . . . Brightness of the previous image.

W . . . Weighting coefficient.

Note that the Z position Zc of the current image is calculated based on the following interpolative calculation, where Zco is the Z position at which the current image is transferred, Zpo is the Z position at which the previous image is transferred, tdelay is transfer delay time of an image frame, and tframe (=1/frame rate) is an image transfer interval. Note that the formula for calculating Zc is not limited to the following interpolative calculation. Further some pieces of image data may be used to calculate the contrast of the like.

$$Zc=Zco-(Zco-Zpo)\times tdelay/tframe$$

Figure 13:
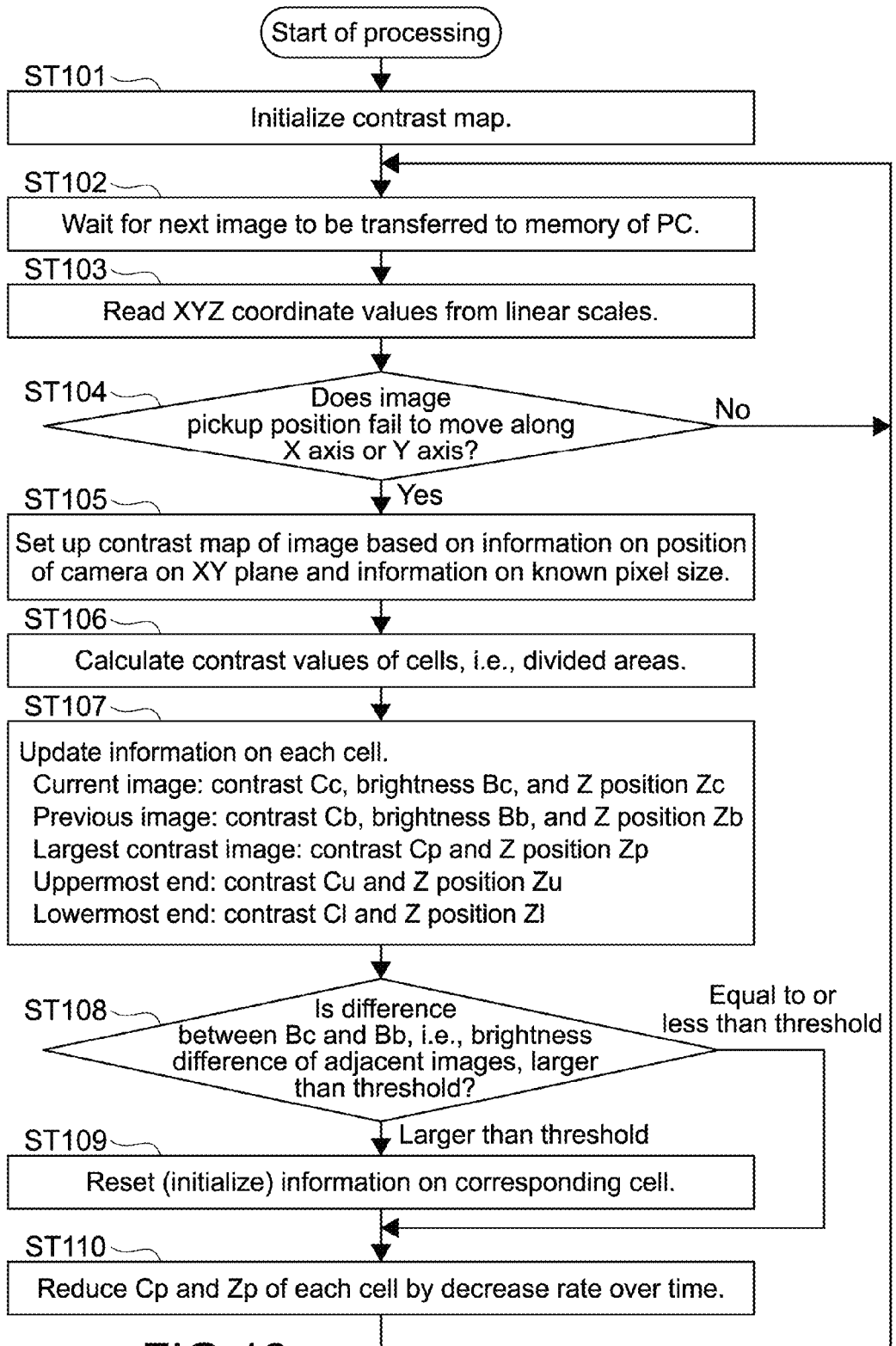
FIG. 13 is a flowchart showing an example of the way to update divided-area information.

FIG. 13 is a flowchart showing an example of the way to update divided-area information. First the contrast map 288 is initialized (Step 101). The main PC 221 waits for the next image to be transferred (Step 102). The XYZ coordinate of the image pickup position 285 is obtained based on the machine coordinate system (Step 103). For example the coordinate values are read from linear scales.

It is determined if the image pickup position 285 fails to move along the X axis or the Y axis or not. In other words, it is determined if the X coordinate value and the Y coordinate value of the image pickup position 285 fail to be changed or not (Step 104). If the X coordinate value and the Y coordinate value are changed (Step 104, No), the object image 260 is a flowing image. The accurate contrast value may not be calculated. So the process is skipped and the flow returns to Step 102.

If the image pickup position 285 fails to move in the X axis and the Y axis (Step 104, Yes), the contrast map 288 is set up based on information on the position of the camera on the XY plane and information on the pixel size (Step 105). The contrast values of the divided areas 280 in the camera view 289 are calculated (Step 106).

The divided-area information on each cell is updated as follows (Step 107).

If Cc>Cp, Cp=Cc and Zp=Zc . . . the largest contrast value is updated.

If Zc>Zu, Cu=Cc and Zu=Zc . . . the contrast value of the uppermost end is updated.

If Zc>Zl, Cl=Cc and Zl=Zc . . . the contrast value of the lowermost end is updated.

After Cp, Zp, Cu, Zu, Cl, and Zl are determined, the divided-area in-focus position, i.e., the first in-focus position of each divided area 280, is calculated.

At this time, the divided-area in-focus position may be determined as follows.

If Zp is below the current position Zc and if Cl is smaller than Cp, it is determined that the focus position is in the vicinity of Zp, and Zp is calculated as the divided-area in-focus position (red cells are displayed).

If Zp is above the current position Zc and if Cu is smaller than Cp, it is determined that the focus position is in the vicinity of Zp, and Zp is calculated as the divided-area in-focus position (red cells are displayed).

If Cu equals to Cp and if Cu is larger than Cl, it is determined that the focus position is above Zu, and the divided-area in-focus position is yet to be determined (blue cells are displayed).

If Cl equals to Cp and if Cl is larger than Cu, it is determined that the focus position is below Zl, and the divided-area in-focus position is yet to be determined (yellow cells are displayed).

With reference to the flowchart again, in Step 108, the difference between Bc and Bb, i.e., the brightness difference of the adjacent images, is calculated. If the difference between Bc and Bb is larger than a predetermined threshold, information on the corresponding cell is reset (initialized) (Step 109). That is, if the brightness of the image (in cell) is changed drastically, then it is determined that there occurs a great change (e.g., the work 3 is replaced, etc.). Then it is determined that previous contrast information is not used, and the contrast information is reset. If the divided-area in-focus position is determined, the lock-on is canceled.

If the difference between Bc and Bb is equal to or less than the predetermined threshold, then Cp and Zp of each cell are reduced by the decrease rate over time (Step 110). This is according to the process of FIG. 8.

If the process of Step 110 is finished, the flow returns to Step 102. In other words, the loop processing is continued from the start of the program to the end of the program.

Next, with reference to FIG. 14 to FIG. 16, the processing relating to movement of the image pickup position 285 will be described. For example, when a user adjusts the position 121 of the camera 118 manually, he moves a work in the XY plane direction to the center of the screen, or he inputs an operation to adjust the height of the camera 118. For example when adjusting the position 121 of the camera 118 or when searching for a target as described above, the image pickup position 285 is moved in the XY plane direction.

Figure 14:
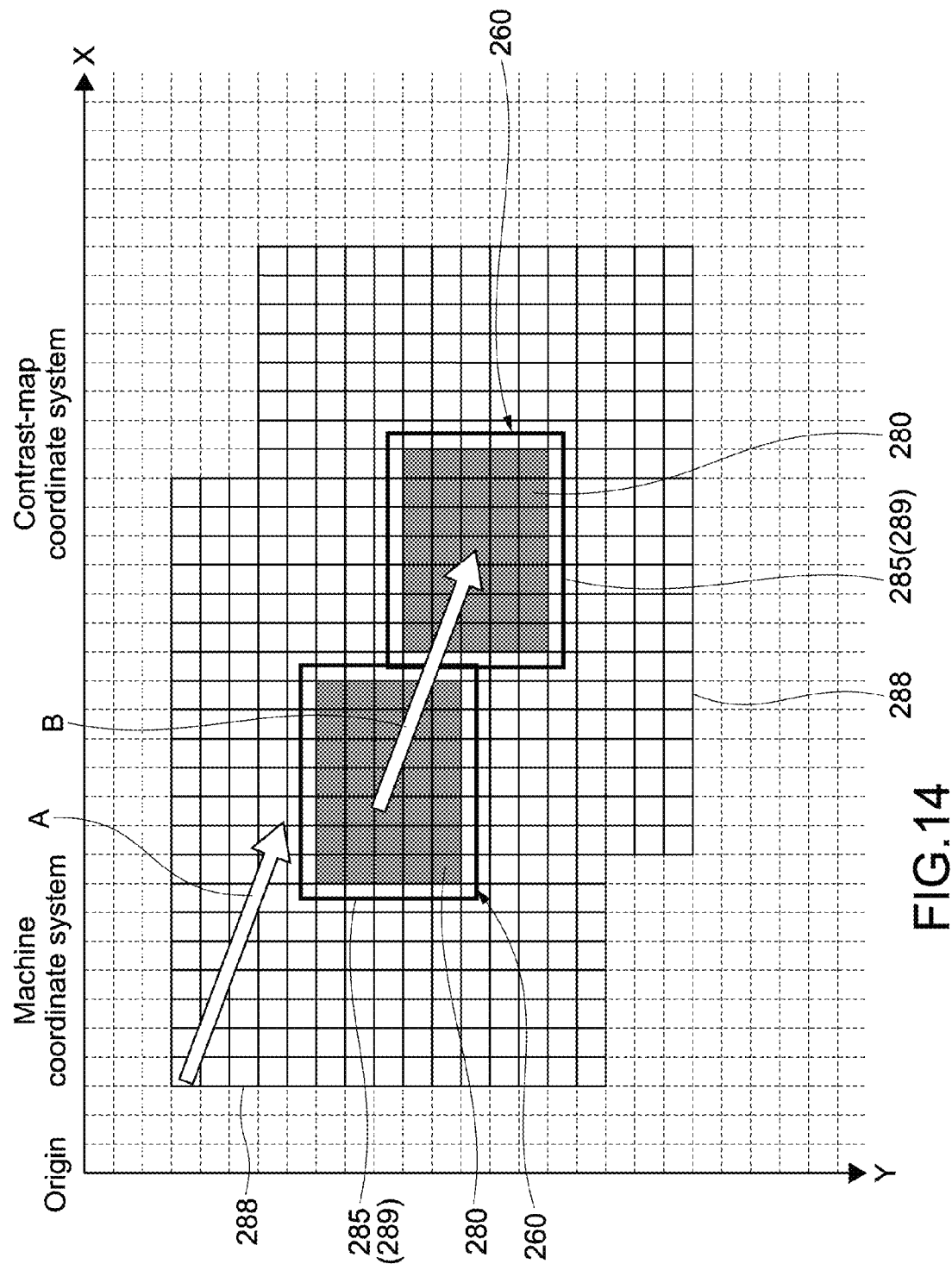
FIG. 14 is a diagram illustrating the way to move a contrast map.

For example the image pickup position 285 of FIG. 11 is moved two-dimensionally on the mount surface as shown in FIG. 14. Then the set position of the contrast map 288 is moved depending on the movement of the image pickup position 285 (see arrows A and B of FIG. 14) based on the coordinate information on the image pickup position 285 and based on information on the pixel size.

Figure 15:
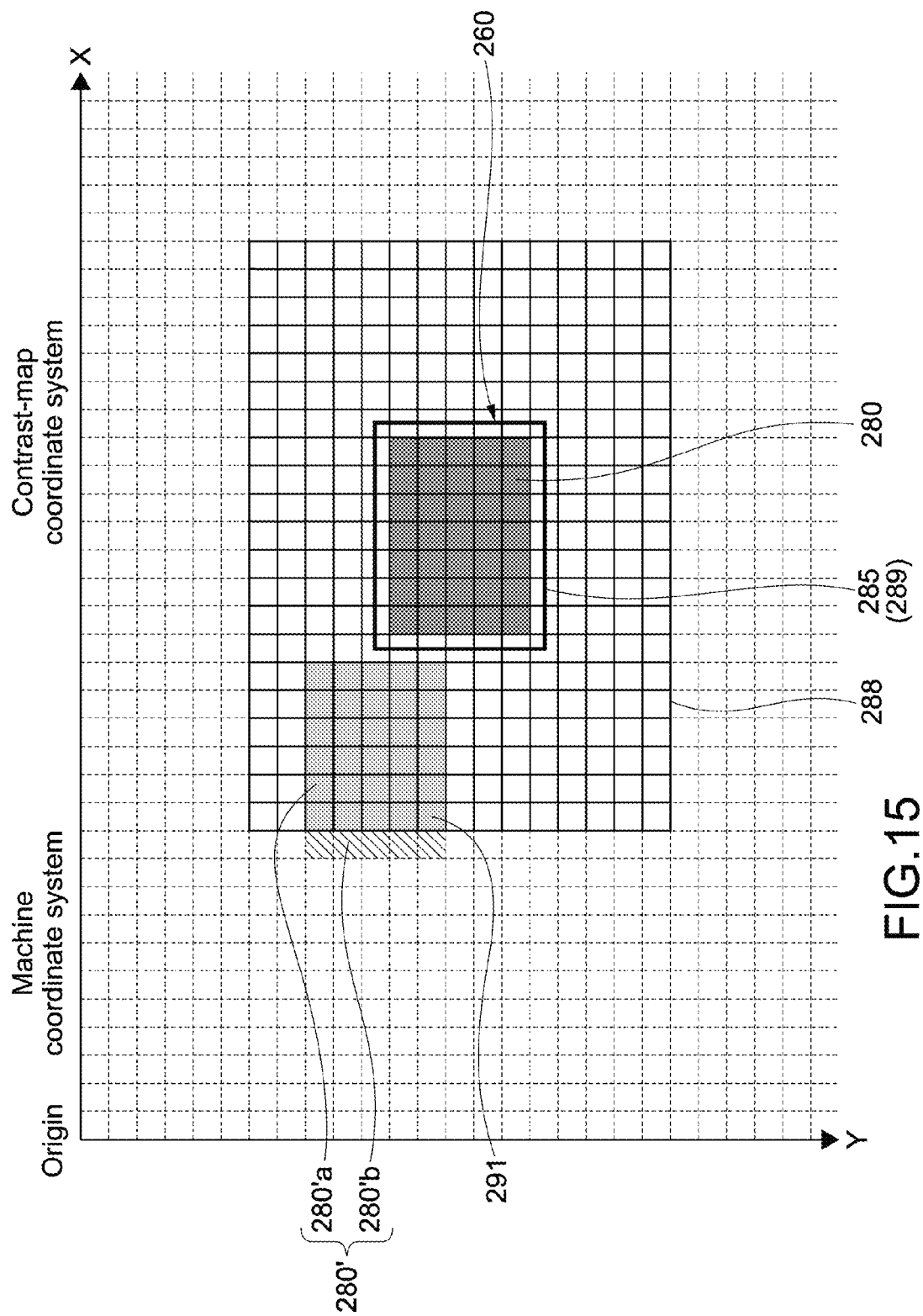
FIG. 15 is a diagram illustrating the way to move the contrast map.

FIG. 15 is a diagram showing the state where the image pickup position 285 has been moved. In FIG. 15, divided-area information is updated for each dark-gray moved divided area 280. The yet-to-be-moved divided areas 280' include light-gray areas 280'a and hatched areas 280'b. The yet-to-be-moved divided areas 280' are outside of the image pickup area 289. So divided-area information on the each yet-to-be-moved divided area 280' is not updated.

The moved contrast map 288 includes the light-gray areas 280'a outside of the yet-to-be-moved divided areas 280'. The areas 280'a are outside of the image pickup area 289 and in the moved contrast map 288. Such areas 280'a are referred to as stored areas 291. Divided-area information, which was updated when each divided area 280 was set, is stored for each stored area 291. Meanwhile, the hatched areas 280'b are outside of the moved contrast map 288. So the divided-area information on each hatched area 280'b updated in the past is deleted.

Figure 16:
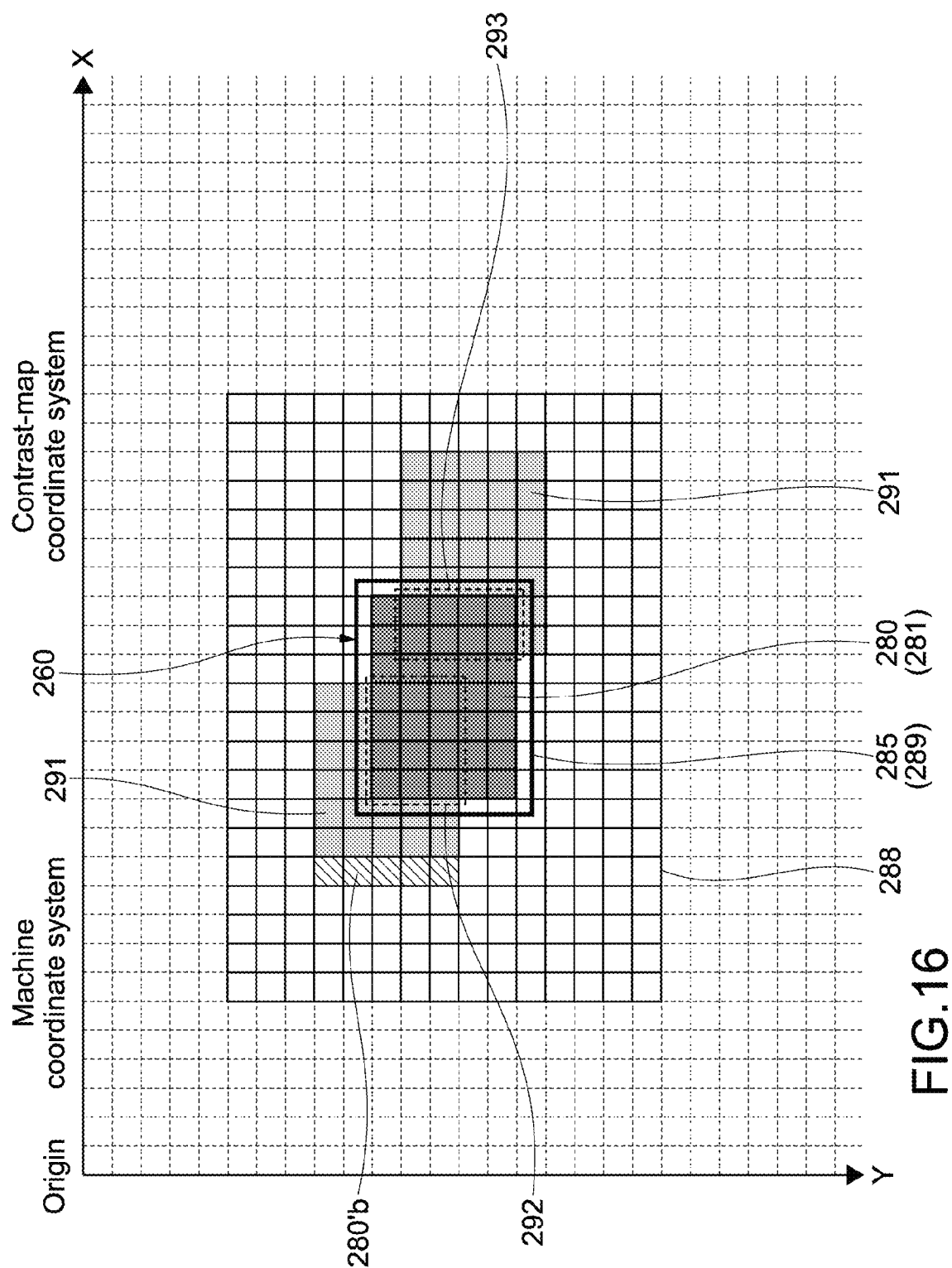
FIG. 16 is a diagram illustrating the way to move the contrast map.

The image pickup position 285 of FIG. 15 is moved as shown in FIG. 16. Divided-area information is updated for each cell 281 of each dark-gray divided area 280. Further, the moved contrast map 288 includes the stored areas 291 out of the cells 281 of the yet-to-be-moved divided areas 280'. Divided-area information on each stored area 291 is stored. When divided-area information on each divided area 280 is updated, divided-area information on each stored area 291, which was stored before the divided areas 280 are moved, is referred to as necessary.

In other words, in FIG. 16, the pieces of divided-area information on the divided areas 280 in a portion 292 and the divided areas 280 in a portion 293, which are stored in the past, are referred to and updated. The divided areas 280 in the portion 292 overlap with the stored areas 291, which are set when the divided areas 280 are moved as shown in FIG. 15. The divided areas 280 in the portion 293 overlap with the stored areas 291, which are set when the divided areas 280 are moved as shown in FIG. 16. As a result, a calculation time period and a calculation amount may be reduced. Note that the divided-area information on each hatched area 280'b of FIG. 15 has been deleted, and will never be restored.

As described above, in this embodiment, the contrast map 288 larger than the image pickup area 289 is set. The set position of the contrast map 288 is moved as the image pickup position 285 is moved. As a result, even if the image pickup position 285 is moved, it is possible to calculate the focus position Z_focus of the image pickup position 285 at the new position at a high velocity. In other words, wherever the image pickup position 285 is within the movable range, it is possible to calculate the focus position Z_focus at a high velocity.

Further, divided-area information on each divided area 280 of the object image 260 is stored for each area 290 (cell) of the set contrast map 288. Each divided area 280 corresponds to each area 290. The divided-area information includes contrast information and divided-area in-focus position information. Then if the image pickup position 285 is moved, the divided-area information on each area 290 in the contrast map 288, which was stored before the image pickup position 285 is moved, is referred to. The divided-area information on each moved divided area 280 is updated. As a result, it is possible to calculate the divided-area in-focus position of each moved divided area 280 in a short time.

Figure 17:
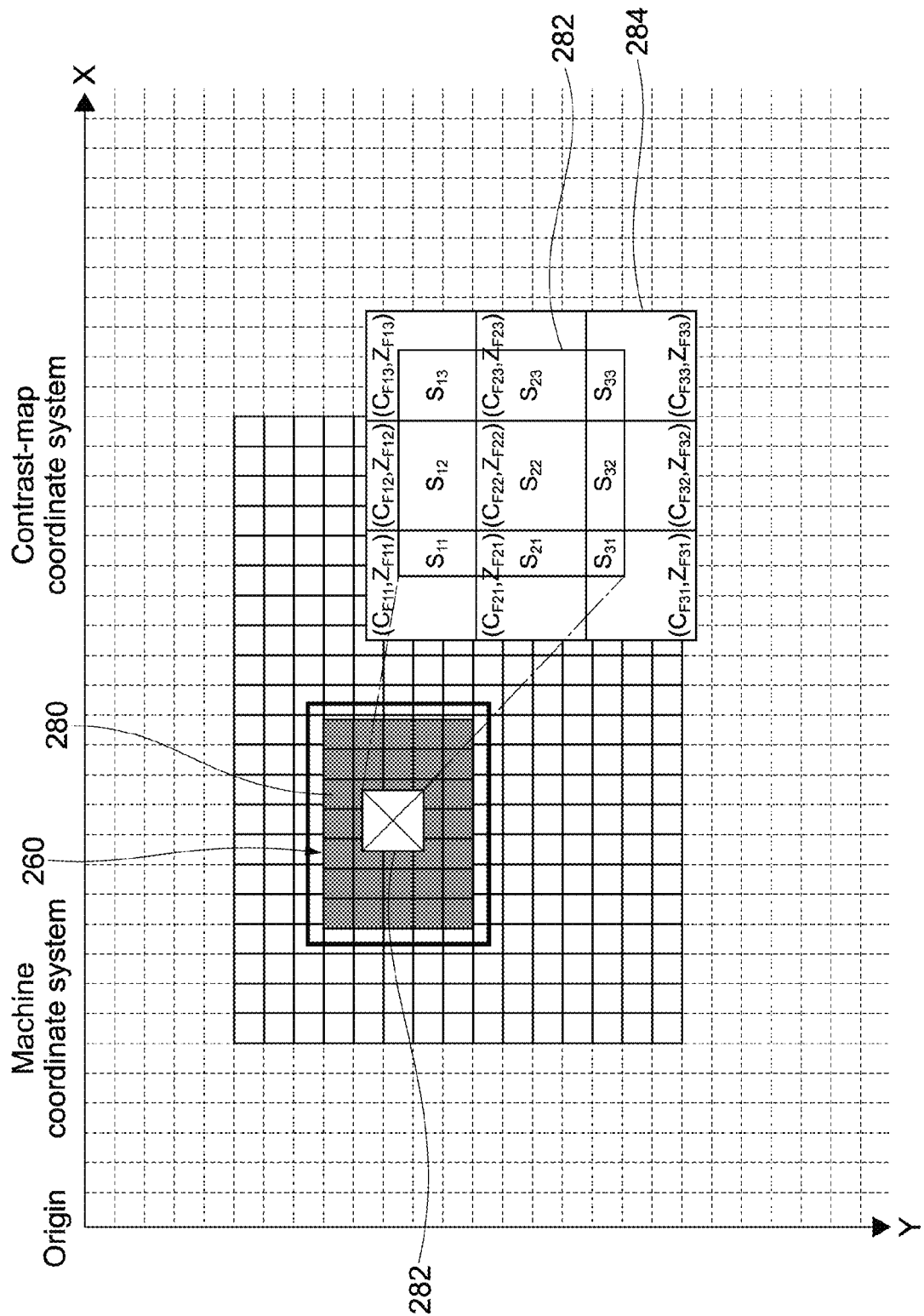
FIG. 17 is a diagram illustrating an example of calculating a first in-focus position based on divided-area information.

FIG. 17 is a diagram illustrating an example of calculating the first in-focus position 125 based on divided-area information. As shown in FIG. 17, the reference area 282 is set at the center of the object images 260. Then the calculation-object areas 284 are set. The calculation-object areas 284 overlap with the reference area 282. Cp and Zp are calculated based on the following formula by using divided-area information on each calculation-object area 284, where Cp is the largest contrast value (contrast peak value) of the entire object image 260 and Zp is the first in-focus position corresponding to Cp.

$$Cp = \Sigma(Cpi,j \times Si,j)/\Sigma Si,j$$

$$Zp = \Sigma(Zpi,j \times Cpi,j \times Si,j)/\Sigma(Cpi,j \times Si,j)$$

where $Cpi,j$ is the largest contrast value of each calculation-object area 284, $Zpi,j$ is the Z value of the largest contrast of each calculation-object area 284, and $Si,j$ is the size of the area in which part of the reference area 282 overlaps with the calculation-object area 284.

In this manner, the calculation-object areas 284 are weighted based on the size of the area in which part of the reference area 282 overlaps with the calculation-object area 284, and based on the largest contrast value Cp, i.e., the contrast information on the calculation-object area 284. As a result, it is possible to calculate the first in-focus position 125 with a high degree of accuracy. Note that Cu, Cl, Zu, and Zl of the entire object image 260 may be calculated based on the formula similar to the above-mentioned formula, and the first in-focus position 125 may be determined (see paragraph [0115]).

Note that if an imaging optical system including an objective lens forms an image of a work and the image is taken, an interchangeable mechanism such as a revolver may interchange objective lenses of the imaging optical system, or a user may replace objective lenses. For example an objective lens is interchanged to or replaced by an objective lens having a predetermined magnification (hereinafter collectively referred to as "to interchange objective lenses"). As a result, a user may observe an object image at a predetermined magnification.

If objective lenses are interchangeable with each other, contrast maps may be stored for the objective lenses used in an imaging optical system, for example. Each contrast map is used to calculate the first in-focus position. For example if three objective lenses are interchangeable with each other, three contrast maps are stored corresponding to the three objective lenses, respectively. A contrast map and divided-area information are stored in storage for each divided area.

The divided-area information is set with reference to the contrast map for each objective lens to be used. Note that the number of interchangeable objective lenses and the number of contrast maps stored corresponding to the interchangeable objective lenses are not limited.

If the objective lenses are interchange, the contrast map and the divided-area information corresponding to an objective lens are read as necessary, and the first in-focus position is calculated. For example if a user operates the vision measuring apparatus 300 with a first objective lens, a program reads a first contrast map corresponding to the first objective lens, and updates divided-area information every time an object image is input. After that, a user interchanges the first objective lens with a second objective lens, and operates the vision measuring apparatus 300. In this case, the program reads a second contrast map corresponding to the second objective lens, and updates divided-area information calculated with reference to the second contrast map. After that, if a user interchanges the second objective lens with the first objective lens again and operates the vision measuring apparatus 300, the first contrast map is read again. Further, divided-area information is updated again with reference to the previously-updated first contrast map every time an object image is input.

As described above, a contrast map is stored for each objective lens. If objective lenses are interchanged, a corresponding contrast map is read. As a result, even if objective lenses are interchanged, it is possible to perform predictive AF immediately after that.

Further, for example, a zoom lens may be used as an objective lens, and the zoom position of the zoom lens may be controlled, to thereby change magnification at a plurality of levels. In this case, contrast maps, each of which is used to calculate a first in-focus position, may be stored for each magnification to be changed, for example. If magnifications are interchangeable in three levels by controlling the zoom position for example, three contrast maps are stored corresponding to the three-level magnifications, respectively. When a user operates the vision measuring apparatus 300, a contrast map and divided-area information corresponding to the magnification of the objective lens are read as necessary, and the first in-focus position is calculated. As a result, even if magnifications are interchanged, it is possible to perform predictive AF immediately after that.

Here, AF of this embodiment is compared to AF of a comparative example. According to AF of a comparative example, an AF instruction is input after manual adjustment. One camera-moving direction is determined when the AF instruction is input. For example the camera moves in the upward direction within the search range, and a contrast peak is searched for. As a matter of course, the downward direction within the search range may be set as the first camera-moving direction.

If a contrast peak is found when the camera moves in the first direction, search is finished, and the camera moves to the focus position corresponding to the contrast peak. If a contrast peak is not found, the camera moves to the uppermost end of the search range. At this time, if a contrast value falls below a predetermined threshold, it is determined that the contrast peak is not above the uppermost end of the search range, and search in the upward direction is stopped.

After the search is stopped, a contrast peak is searched for in the downward direction. If the contrast peak is found, the camera moves to the focus position. If a contrast peak is not found, it is determined that a focus position is not within the search range. In other words, AF is unsuccessful.

Figure 18:
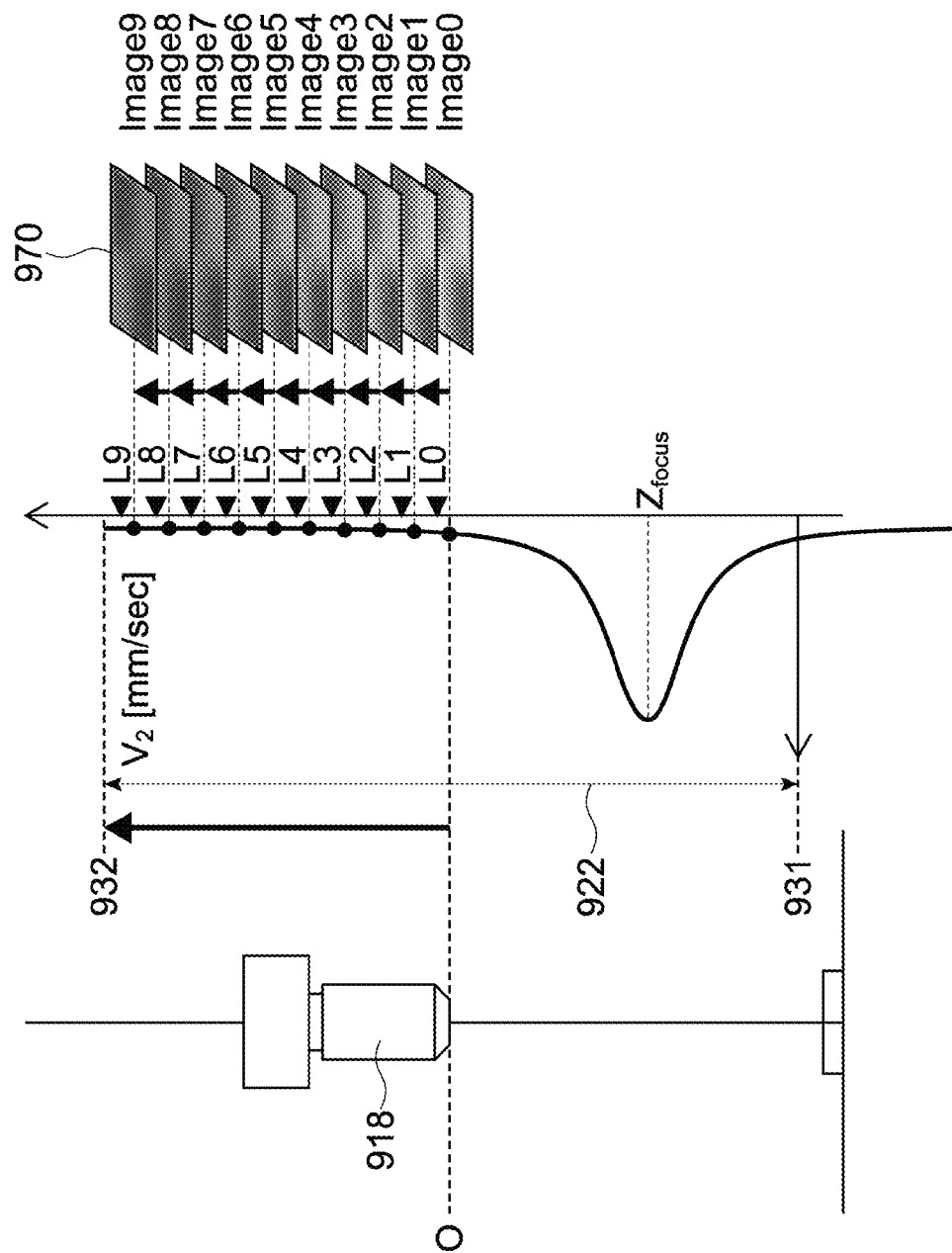
FIG. 18 is a diagram illustrating AF of a comparative example.
Figure 19:
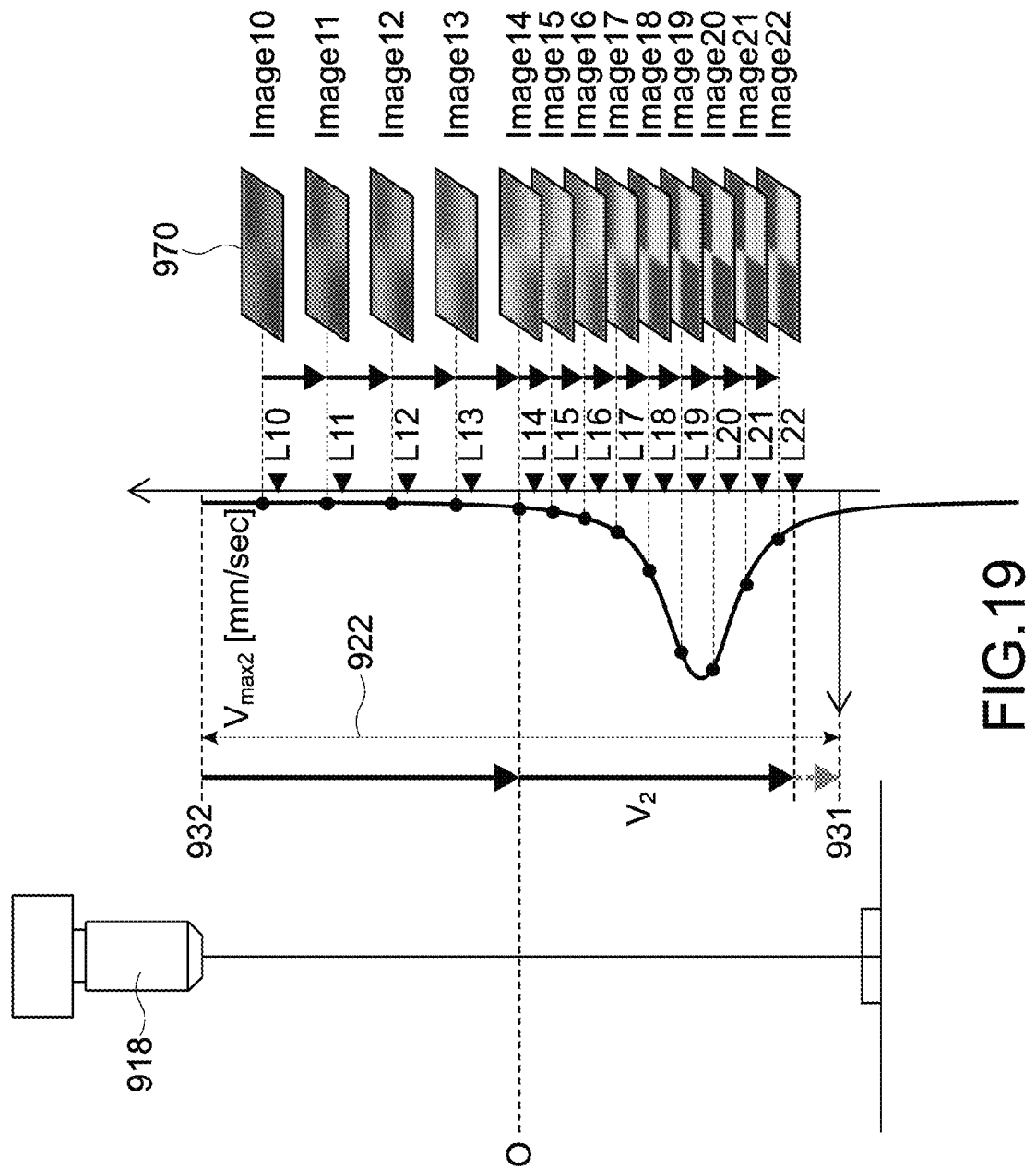
FIG. 19 is a diagram illustrating AF of the comparative example.

FIG. 18 and FIG. 19 are diagrams illustrating AF of the comparative example. As shown in FIG. 18, the focus position Z_focus is at a lower portion of a search range 922. Further, in response to an AF instruction, search is started at a low velocity V2 in the upward direction from the center O of the search range 922. In this case, as shown in FIG. 18, a contrast peak is not detected even if a camera 918 reaches the uppermost end 932 of the search range 922.

Then as shown in FIG. 19, the camera 918 returns from the uppermost end 932 of the search range 922 to the center O at a high velocity Vmax2. Then search toward the lowermost end 931 of the search range 922 is started at the velocity V2. The contrast peak is detected at last when the object image 970 (Image22) is obtained during this search. Then the camera 918 moves to the focus position Z_focus.

In other words, according to the AF in the past, as shown in FIG. 18, the first search is needless, and it takes a long time to calculate the focus position Z_focus. In other words, it takes a long time for AF. For example, an optical system has a small focus depth, and a search range is large to increase user-friendliness of manual adjustment. In such a case or other cases, needless search of FIG. 18 and FIG. 19 is likely to occur. If the focus position Z_focus is in the vicinity of the end opposite to the first moving direction, the scanning distance is approximately half again the length of the search range 922.

FIG. 20 to FIG. 23 are graphs each showing an example of processing time when AF of this embodiment is performed. Each graph of FIGS. 20A, 21A, 22A, and 23A shows the relation between time and the Z position of the camera. Each graph of FIGS. 20B, 20C, 21B, 21C, 22B, 22C, 23B, and 23C shows the relation between the Z position of the camera and the contrast value (contrast value is relative value). The notes in each graph are as follows.

"1st search" is the entire movable range of the first search. In other words, "1st search" is the entire movable range until the second in-focus position is calculated. Specifically, "1st search" includes movement from the AF start position to the start position of a predictive search range, and movement within the predictive search range from the start position of the predictive search range. Description will be made with reference to FIG. 20 to FIG. 23 where the Z positions of the camera are denoted by the reference symbols (alphabets) D to I. "1st search" is search from the position D to the position E (in FIG. 23B, via position E').

"1st fit range" is a range in which a contrast value of each object image is fitted by the method of least squares to obtain a parameter of a model formula of a contrast curve (fitted curve). For example a contrast value larger than a predetermined threshold is used. In FIG. 20 to FIG. 23, "1st fit range" is between the position F and the position E. Note that the position F is approximately the same as the start position of the predictive search range. However, the position F is not necessarily the same as the start position of the predictive search range.

"2nd search" is the entire movable range of a second search. For example, a second in-focus position is calculated in the first search. Further, second search is performed in a range in the vicinity of the calculated second in-focus position. As a result, it is possible to calculate the focus position with a high degree of accuracy. For example, high-velocity-mode search is performed only once for observation. High-accuracy-mode search is performed twice for measurement.

The number of search may be selected as necessary depending on AF modes in this manner. In FIG. 22 and FIG. 23, "2nd search" ranges from the position G to the position H.

"2nd fit range" is a range in which fitting by the method of least squares is performed in the second search. In FIG. 22 and FIG. 23, "2nd fit range" is from the position I to the position H. "Go to the target" is the process to move the camera to the focus position. Note that in each graph, the focus position is Z=0 mm.

Figure 20A:
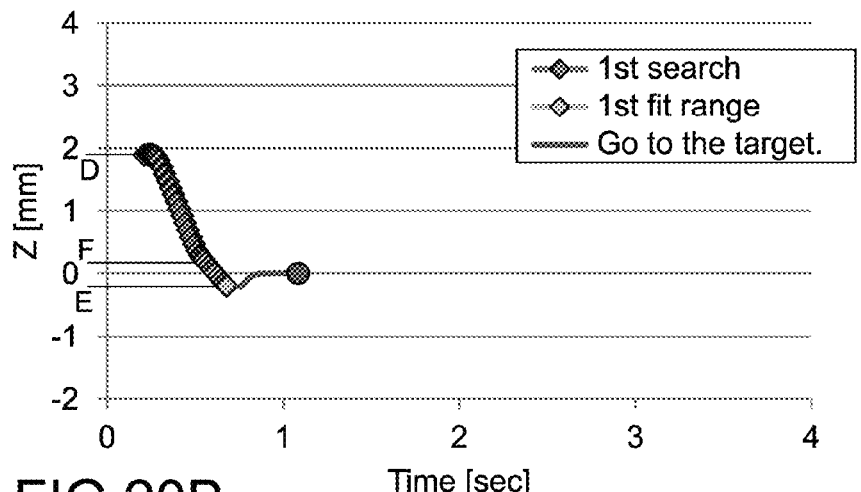
FIGS. 20A-20C are graphs showing an example of processing time when AF of this embodiment is performed.
Figure 20B:
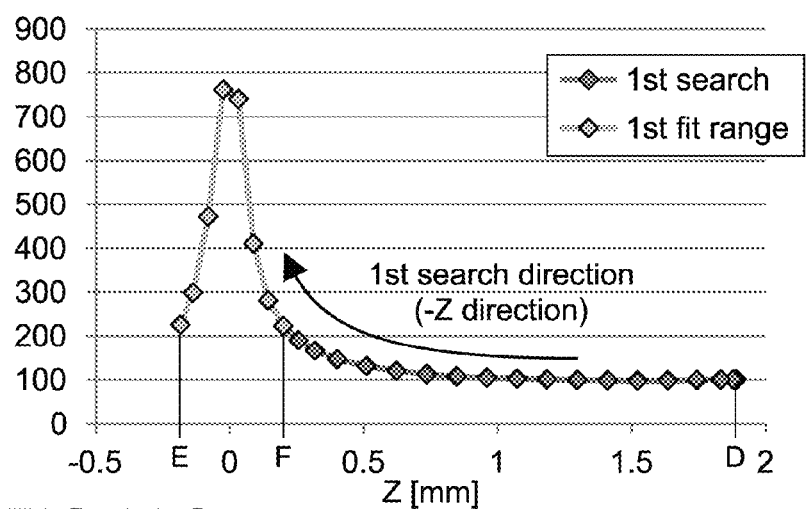
Figure 20C:
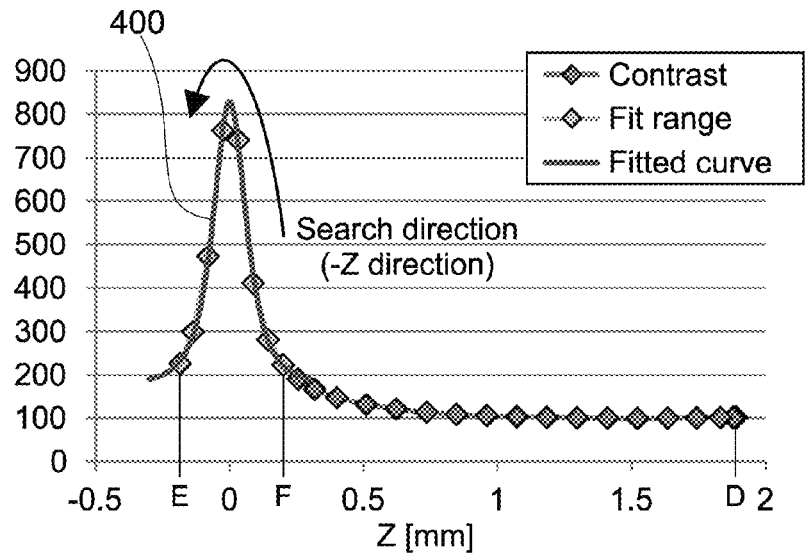

FIG. 20 are diagrams in a case where AF is started above the focus position. In response to an AF instruction, AF is started at the position (Z=about +1.8 mm) above the focus position. As shown in FIGS. 20A and 20B, the camera moves to the start position of a predictive search range at a high velocity. Search is performed within the predictive search range at a low velocity. As shown in FIG. 20C, a contrast curve 400 is calculated. A second in-focus position is calculated as a focus position based on the contrast curve 400.

Figure 21A:
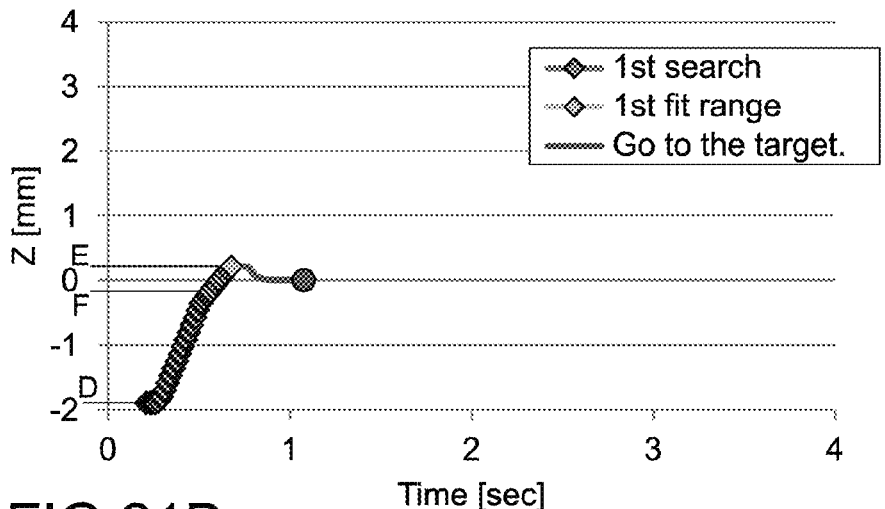
FIGS. 21A-21C are graphs showing an example of processing time when AF of this embodiment is performed.
Figure 21B:
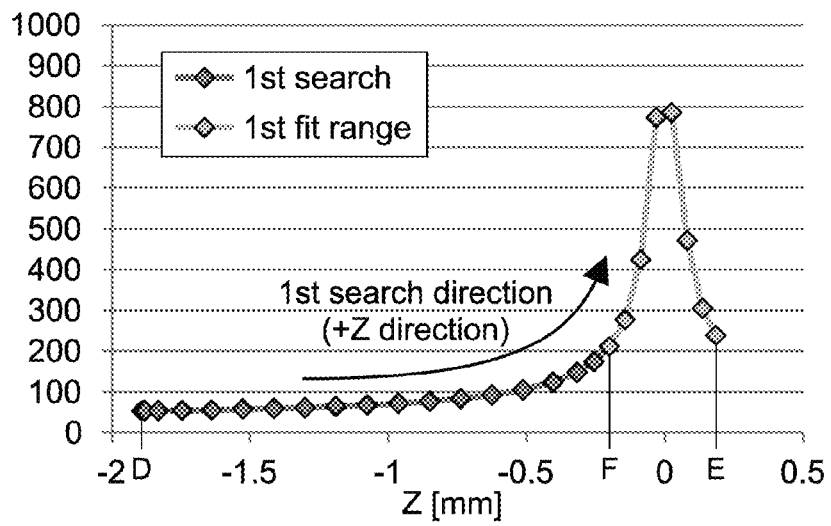
Figure 21C:
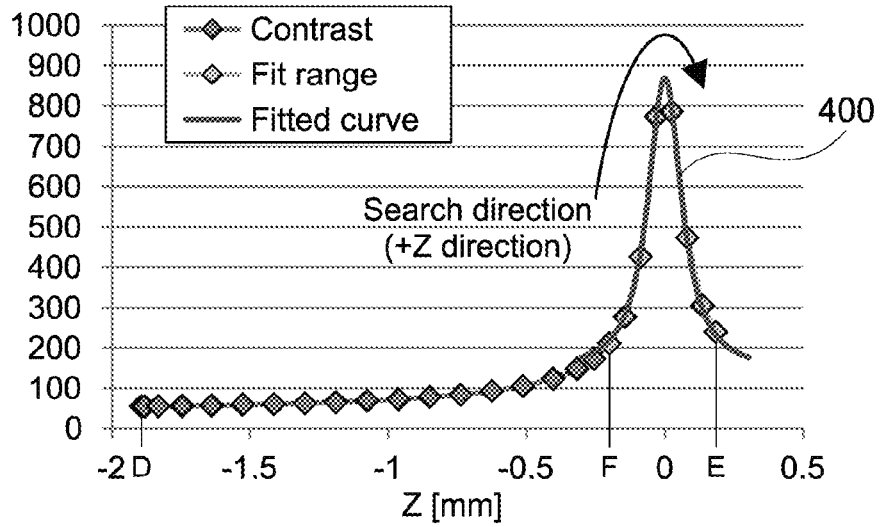

FIG. 21 are diagrams in a case where AF is started below the focus position. In response to an AF instruction, AF is started at the position (Z=about -1.8 mm) below the focus position. As shown in FIGS. 21A and 21B, the camera moves to the start position of a predictive search range at a high velocity. Search is performed within the predictive search range at a low velocity. As shown in FIG. 21C, a contrast curve 400 is calculated. A second in-focus position is calculated as a focus position based on the contrast curve 400.

As shown in the graphs of FIG. 20A and FIG. 21A, it is possible to move the camera to the focus position in a short time (about 1.1 seconds) in the both cases.

Each of FIG. 22 and FIG. 23 are diagrams in a case where second search is performed. In FIG. 22, AF is started above the focus position. First search is started at the position (Z=about +1.8 mm) above the focus position, and the second in-focus position is calculated. The second in-focus position is treated as a provisional focus position, i.e., the reference of second search.

Figure 22A:
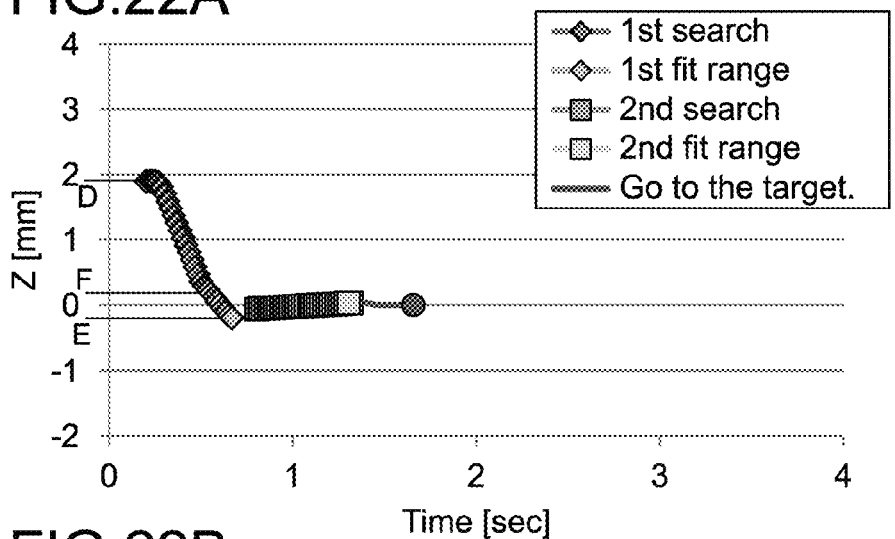
FIGS. 22A-22C are graphs showing an example of processing time when AF of this embodiment is performed.
Figure 22B:
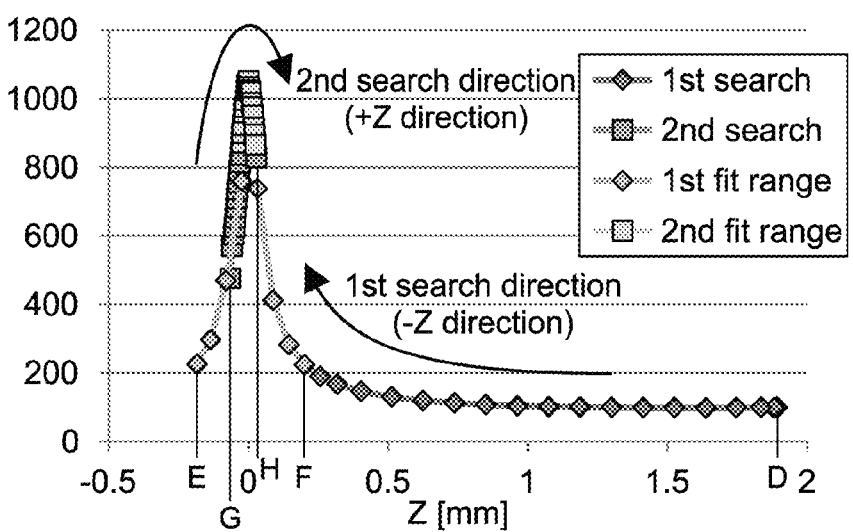
Figure 22C:
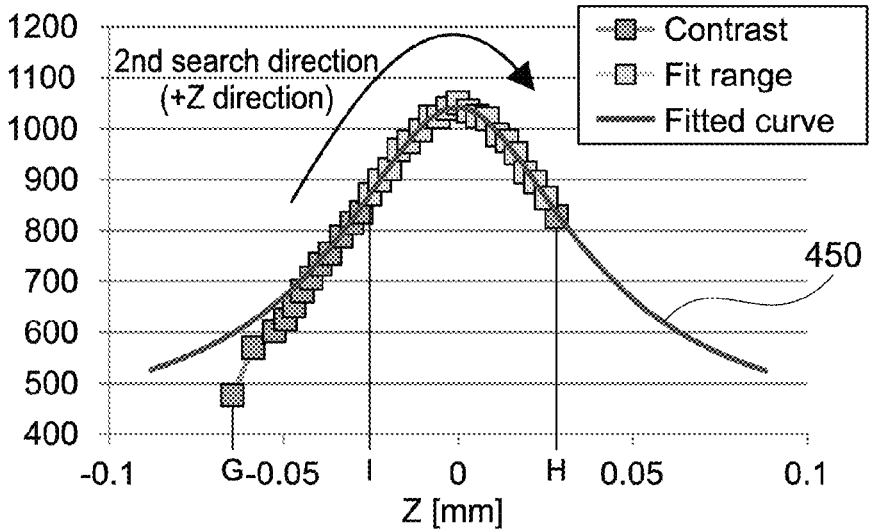

As shown in FIG. 22C, second search is performed from the position G to the position H, i.e., "2nd search". Then for example a contrast value larger than a predetermined threshold is used in "2nd fit range" between the position I and the position H, whereby a contrast curve 450 is calculated. The focus position is calculated based on the contrast curve 450. Note that the larger the fit range, the higher the accuracy of AF. However, because it is necessary to obtain the larger amount of data, it takes a longer time to perform AF. In view of this, the length of the fit range may be set as necessary.

In FIG. 23, AF is started below the focus position. First search is started at the position (Z=about -1.8 mm) below the focus position, and the second in-focus position is calculated. The second in-focus position is treated as a provisional focus position, i.e., the reference of second search.

Figure 23A:
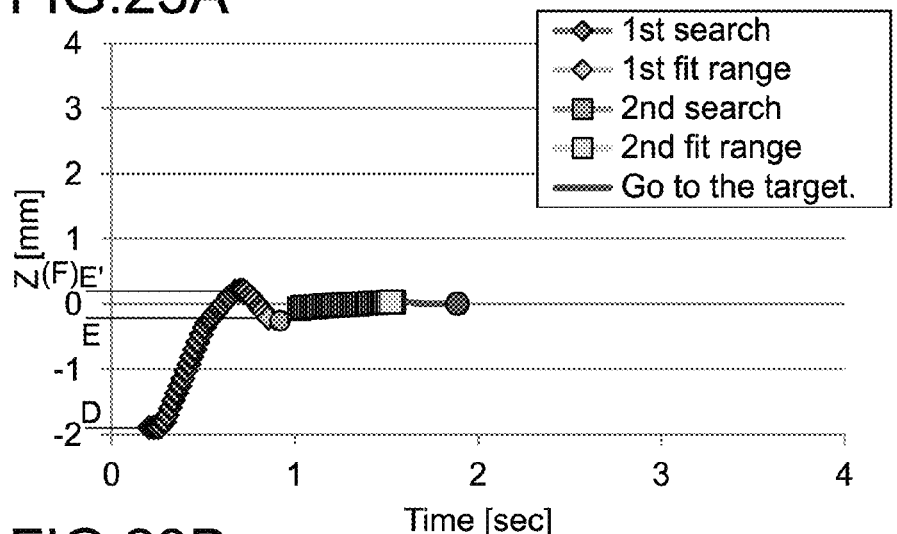
FIGS. 23A-23C are graphs showing an example of processing time when AF of this embodiment is performed.
Figure 23B:
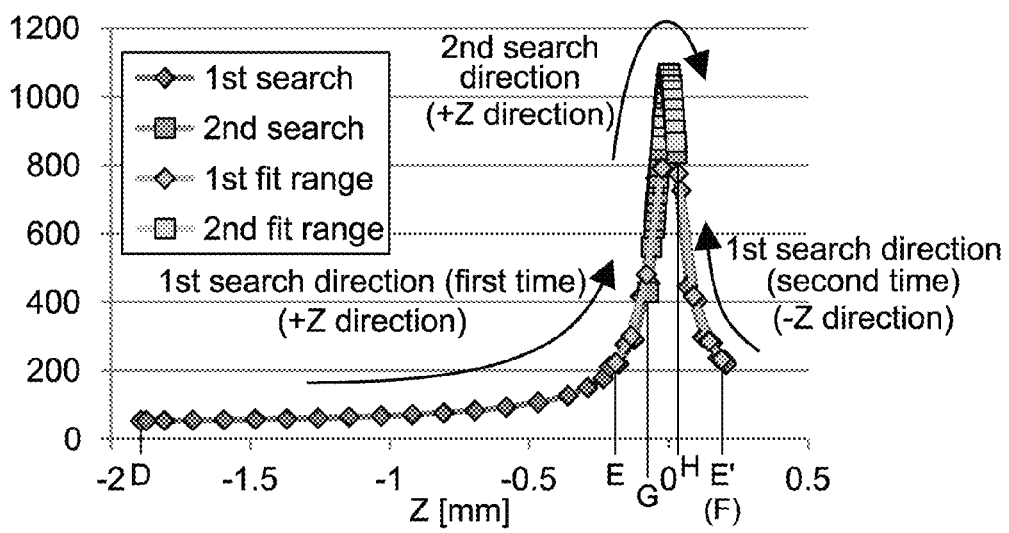

Note that in the example of FIG. 23, search is performed downward to calculate a second in-focus position. In other words, the uppermost end of the predictive search range is set as the start position of the predictive search range. When AF is started, the camera moves at a high velocity from the position (Z=about -1.8 mm) to the uppermost end of the predictive search range. Further, a predictive search range is searched downward, and a second in-focus position is calculated. As shown in FIG. 23B, the camera firstly moves from the position D to the position E'. Then search is performed from the position E', i.e., the position F, to the position E.

As described above, one search direction is set. As a result, it is possible to calculate the second in-focus position with a high degree of accuracy. Search may be performed in the both directions similar to the high-velocity-mode search for observation of FIG. 20 and FIG. 21. In this case, accuracy will be decreased slightly. However, AF will be performed faster because the camera does not move in the opposite direction. In view of this, it may be determined if one search direction is selected or the both search directions are selected.

Figure 23C:
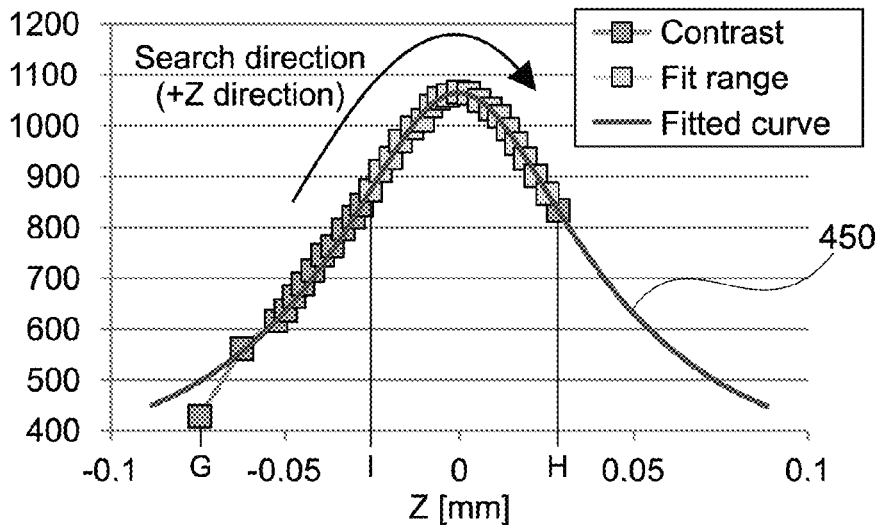

As shown in FIG. 23C, second search is performed from the position G to the position H, i.e., "2nd search". Then for example a contrast value larger than a predetermined threshold is used in "2nd fit range" between the position I and the position H, whereby a contrast curve 450 is calculated. The focus position is calculated based on the contrast curve 450.

In the example of FIG. 22A, it is possible to move the camera to the focus position in a short time, i.e., about 1.6 seconds. Further, in the example of FIG. 23A, it is possible to move the camera to the focus position in a short time, i.e., about 1.9 seconds. According to AF of the present technology, it is possible to move the camera to the focus position less than two seconds even if second search is performed as described above. As a matter of course, processing time may be changed depending on various conditions.

FIG. 24 are graphs showing processing time of AF of comparative examples. FIG. 24A is a diagram in a case where AF is started at the position (Z=about +1.8 mm), and search is performed once. The example of FIG. 24A corresponds to the AF operation of FIG. 18 and FIG. 19. In other words, search is performed from the position J to the uppermost end of the search range, i.e., the position K. A contrast peak is not detected within the range, and the camera returns to the position J at a high velocity. Then search is performed to the position L, and the focus position is calculated. As shown in FIG. 24A, it takes about 2.3 seconds until the camera moves to the focus position. AF of this embodiment shown in FIG. 20 is faster than AF of FIG. 24A by about 1.2 seconds. AF of the embodiment shown in FIG. 20 is performed about 2.1 times faster than AF of FIG. 24A.

Figure 24A:
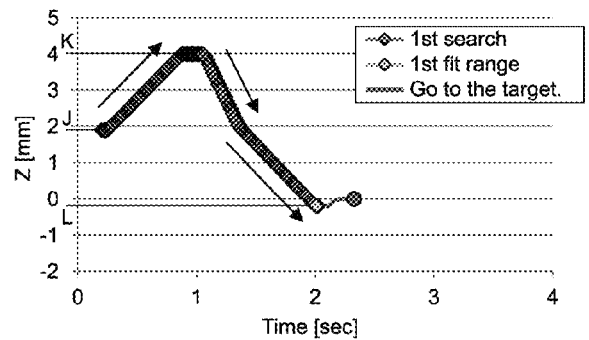
FIGS. 24A-24D are graphs showing processing time of AF of comparative examples.
Figure 24B:
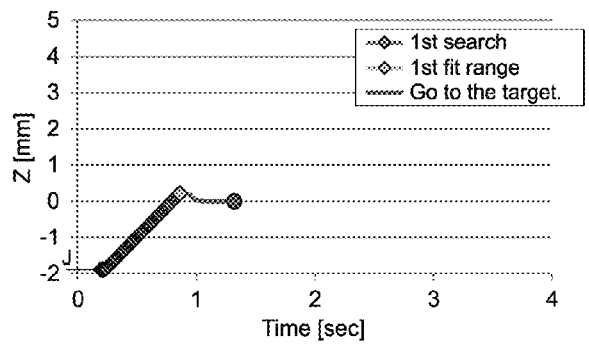

FIG. 24B is a diagram in a case where AF is started at the position (Z=about -1.8 mm), and search is performed once. Search is performed at a low velocity from the start position, i.e., the position J.

As a result, it takes about 1.4 seconds until AF is finished. AF of this embodiment shown in FIG. 21 is faster than AF of FIG. 24B by about 0.3 seconds. AF of the embodiment shown in FIG. 21 is performed about 1.3 times faster than AF of FIG. 24B. Even if the focus position exists in the first search direction as described above, it is possible to calculate the focus position at a higher velocity than AF of the comparative example.

Figure 24C:
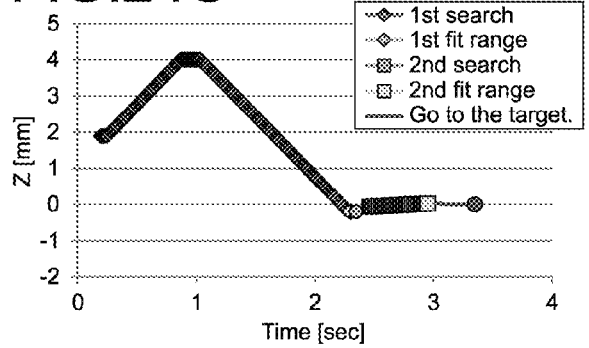

FIG. 24C is a diagram showing a case where AF is started at the position (Z=about +1.8 mm), and search is performed twice. It takes about 3.4 seconds until AF is finished. AF of this embodiment shown in FIG. 22 is faster than AF of FIG. 24C by about 1.8 seconds. In other words, AF of the embodiment shown in FIG. 22 is performed about 2.1 times faster than AF of FIG. 24C.

Note that in the example of FIG. 24C, the camera does not move at a high velocity. Let's assume that for example as shown in FIG. 24A, the camera moves at a high velocity from the position K to the position J. In this case, it is possible to reduce processing time sufficiently if the present technology is used.

Figure 24D:
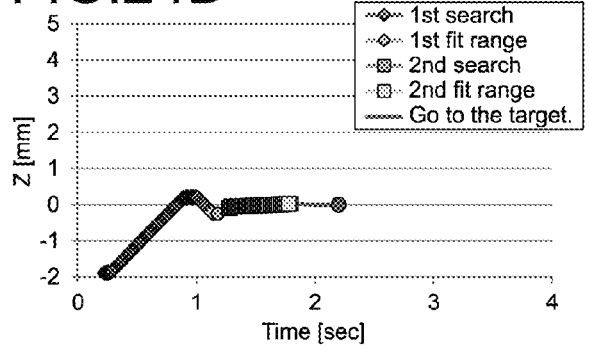

FIG. 24D is a diagram in which AF is started at the position (Z=about -1.8 mm), and search is performed twice. Note that similar to FIG. 23A, the downward first search direction is set. It takes about 2.2 seconds until AF is finished. AF of this embodiment shown in FIG. 23 is faster than AF of FIG. 24D by about 0.3 seconds. In other words, AF of the embodiment shown in FIG. 23 is performed about 1.2 times faster than AF of FIG. 24D.

For example a digital microscope is used as the vision measuring system. Because the focus depth of an objective lens of an optical microscope is small, the contrast is decreased if the focus is out of the contrast peak (focus position) if only a little. The higher the magnification, the larger the decreasing rate of contrast. It is necessary to make search velocity lower in such an optical system having the small focus depth. Meanwhile, it is necessary to make the search range larger to improve user-friendliness of AF. If the search velocity is lower and if the search range is larger, it takes longer time to perform AF.

According to the vision measuring apparatus of this embodiment, as preparation for AF, a program predicts a focus position roughly when a user adjusts the Z position of the camera, e.g., when the camera passes through the focus position. In other words, the contrast of each image is monitored before AF processing. As a result, a first in-focus position is previously obtained as a rough focal position. When AF is performed, the camera moves at a high velocity to the vicinity of the predicted first in-focus position. After that, a second in-focus position is searched for at a low velocity with a high degree of accuracy. As a result, it is possible to perform AF at a high velocity with a high degree of accuracy.

Further, the program holds a contrast map containing a camera view divided in a grid. The program keeps on searching for the Z position having the largest contrast in the grid even if AF is not being performed. The position information on the XYZ-axis scales and the pixel size of an object image are known. If the stage and the image pickup unit move, the contrast map of the program is moved in combination.

A contrast map containing an area outside of the camera view is created based on position information on the XYZ-axis scales. As a result, it is possible to perform AF at an arbitrary position at a high velocity with a high degree of accuracy. In other words, it is possible to perform AF at an arbitrary position in the view at a high velocity with a high degree of accuracy.

User-friendliness is increased largely. Further, a high degree of accuracy is attained, user-friendliness is increased, and processing time is reduced at the same time.

Further, the present disclosure is realized only by software algorithm. It is not necessary to prepare special hardware. So it is possible to increase the performance without increasing costs. As a result, AF accuracy as high as in the past may be realized at a high velocity without increasing costs.

Further, according to the present disclosure, the following effects may be obtained. Note that all the following effects may not be obtained simultaneously, but some of the following effects may be obtained depending on conditions and the like.

It is possible to focus on a desired position, and stress-free observation and measurement may be realized.

It is possible to perform 3D measurement at a higher velocity with a high degree of accuracy by using the XYZ-axis linear scales.

It is possible to perform AF at a high velocity at any position within a wide focus search range.

It is possible to further increase user-friendliness of focusing of an optical microscope.

If the magnification of an objective lens is larger (focus depth is smaller), user-friendliness of focusing may be increased.

The present disclosure may be realized by a low-cost system configuration only including a microscope optical system having an electric stage and a camera.

It is not necessary to prepare expensive options for high-velocity AF.

It is possible to realize high-velocity AF in previously-shipped systems by only upgrading software.

Other Embodiments

The present technology is not limited to the above-mentioned embodiment. Other various embodiments may be implemented.

For example, the size of the contrast map 288 of FIG. 11 may be changed. Specifically, the entire movable range of the image pickup position 285, i.e., the entire contrast-map coordinate system, may be set up as the contrast map 288. In this case, even if the image pickup position 285 is moved, it is not necessary to move the contrast map 288. Meanwhile, in the above-mentioned embodiment, the contrast map 288 is part of the coordinate system. In this case, it is possible to for example reduce a load applied to the memory of the PC 200.

Note that an information processing apparatus capable of performing AF by using a contrast map of the present disclosure may be used as an information processing apparatus according to this embodiment of the present disclosure irrespective of performing predictive AF of the present disclosure. For example in such an information processing apparatus, a CPU operates according to a predetermined program, and implements an obtaining unit, storage, a setup unit, and a calculator.

A plurality of object images are taken while moving a focal position within a movable range in the Z-axis direction (focal-axis direction). The obtaining unit obtains the plurality of object images. A contrast map, i.e., a map-for-calculation, is stored in the storage and is used. The setup unit sets a plurality of divided areas, which is obtained by dividing each object image. The calculator calculates a divided-area in-focus position, i.e., an in-focus position for each divided area. The calculator calculates an in-focus position (focus position) of each object image within the movable range based on the divided-area in-focus position information.

For example, in AF of each comparative example, a contrast map may be used. In this case, an information processing apparatus performing the AF of the comparative example is within the scope of the information processing apparatus according to this embodiment of the present disclosure. If a contrast map is used for AF processing, it is possible to calculate a focus position at a high velocity with a high degree of accuracy.

At least two features of the above-mentioned embodiment may be combined.

The invention claimed is:

1. An information processing apparatus, comprising a processor for performing processes of:
   an obtainer configured to obtain a plurality of object images, the plurality of object images being taken by an image pickup while moving a focal position within a predetermined range, the image pickup being capable of taking images of an object at arbitrary focal positions within the predetermined range;
   a first calculator capable of calculating a first in-focus position within the predetermined range based on pieces of contrast information on a manually-taken object image group to obtain a predictive search range, the manually-taken object image group including the plurality of object images taken while manually moving the focal position within the predetermined range, the first calculator configured to calculate a contrast peak value within the predetermined range based on pieces of contrast information on the manually-taken object image group;
   a second calculator capable of calculating a second in-focus position within the predictive search range based on pieces of contrast information on an automatically-taken object image group, the automatically-taken object image group including the plurality of object images taken while automatically moving the focal position within the predictive search range, the predictive search range being determined with reference to the calculated first in-focus position; and a determiner configured to attenuate the contrast peak value at a predetermined rate.

2. The information processing apparatus according to claim 1, further comprising:

a driver capable of moving the focal position within the predetermined range, wherein the driver is configured to move the focal position to one of end points of the predictive search range at a first velocity, and to move the focal position within the predictive search range at a second velocity lower than the first velocity.

3. The information processing apparatus according to claim 1, further comprising:

an operation input, in which an instruction is input by a user, wherein the first calculator is configured to calculate the first in-focus position in response to an operation to manually move the focal position by the user, and the second calculator is configured to calculate the second in-focus position in response to an autofocus instruction input in the operation input by the user.

4. The information processing apparatus according to claim 3, wherein the determiner is further configured to determine that the first in-focus position is invalid if a predetermined time period passes after the first in-focus position is calculated and the autofocus instruction is not input within the predetermined time period.

5. The information processing apparatus according to claim 4, wherein the first calculator is configured to calculate the first in-focus position, the first in-focus position being the focal position corresponding to the peak value, and the determiner is configured to set the predetermined time period, the predetermined time period being a time period until the attenuated peak value falls below a predetermined threshold.

6. The information processing apparatus according to claim 5, wherein the first calculator is configured to calculate a function based on pieces of contrast information on the manually-taken object image group, the function showing relation between the focal position within the predetermined range and the contrast information, and to calculate the contrast peak value, the contrast peak value being a peak value of the function.

7. The information processing apparatus according to claim 1, further comprising:

storage configured to store a map-for-calculation, the map-for-calculation including a plurality of divided areas, wherein the first calculator is configured to calculate divided-area in-focus positions based on pieces of contrast information on a plurality of divided areas, the divided-area in-focus positions being the first in-focus positions of the plurality of divided areas, the plurality of divided areas being obtained by dividing the object image corresponding to a plurality of areas of the map-for-calculation, and to calculate the first in-focus position based on the pieces of information on the divided-area in-focus positions.

8. The information processing apparatus according to claim 7, wherein the first calculator is configured to calculate the first in-focus position based on the pieces of information on the divided-area in-focus positions for calculation-object areas, the calculation-object areas being some divided areas of the plurality of divided areas, the some divided areas overlapping with a reference area in the object image, the reference area being a reference to calculate the first in-focus position.

9. The information processing apparatus according to claim 8, wherein the first calculator is configured to weight the calculation-object areas based on sizes of areas overlapping with the reference area and based on pieces of contrast information on the calculation-object areas, and to calculate the first in-focus position.

10. The information processing apparatus according to claim 7, further comprising:

a driver capable of moving the focal position within the predetermined range, wherein the driver is configured to move the focal position to one of end points of the predictive search range at a first velocity, and to move the focal position within the predictive search range at a second velocity lower than the first velocity.

11. The information processing apparatus according to claim 10, wherein the image pickup is capable of taking an image of the object at an arbitrary image pickup position on a 2D (two-dimensional) plane parallel to a mount surface on which the object is mounted, and X-Y driver capable of moving the image pickup position on the 2D plane, and the map-for-calculation has a larger area than an image pickup area of the object image, the map-for-calculation containing the image pickup area, the map-for-calculation being moved as the image pickup position is moved.

12. The information processing apparatus according to claim 11, wherein the storage is configured to store pieces of contrast information and the pieces of divided-area in-focus position information on divided areas of the object image for areas of the map-for-calculation, the divided areas of the object image corresponding to the areas of the map-for-calculation, the first calculator is configured, if the image pickup position is moved, to refer to the pieces of contrast information and the pieces of divided-area in-focus position information on the areas of the map-for-calculation, the pieces of contrast information and the pieces of divided-area in-focus position information being stored before the image pickup position is moved, and to calculate the divided-area in-focus positions of divided areas of the moved object image.

13. The information processing apparatus according claim 7, wherein the obtainer is configured to obtain the plurality of object images, the plurality of object images being obtained by taking images of the object, the images of the object being formed by an optical system including an objective lens, and the storage is configured to store the map-for-calculation for the objective lens of the optical system, the map-for-calculation being used to calculate the first in-focus position.

14. An information processing method, executed by a computer, comprising:
- obtaining a plurality of object images, the plurality of object images being taken by an image pickup while moving a focal position within a predetermined range, the image pickup being capable of taking images of an object at arbitrary focal positions within the predetermined range;
- calculating a first in-focus position within the predetermined range based on pieces of contrast information on a manually-taken object image group to obtain a predictive search range, the manually-taken object image group including the plurality of object images taken while manually moving the focal position within the predetermined range, and further calculating a contrast peak value within the predetermined range based on pieces of contrast information on the manually-taken object image group;
- calculating a second in-focus position within the predictive search range based on pieces of contrast information on an automatically-taken object image group, the automatically-taken object image group including the plurality of object images taken while automatically moving the focal position within the predictive search range, the predictive search range being determined with reference to the calculated first in-focus position; and
- attenuating the contrast peak value at a predetermined rate.

15. A computer program stored on a non-transitory computer-readable medium, causing a computer to execute:
- obtaining a plurality of object images, the plurality of object images being taken by an image pickup while moving a focal position within a predetermined range, the image pickup being capable of taking images of an object at arbitrary focal positions within the predetermined range;
- calculating a first in-focus position within the predetermined range based on pieces of contrast information on a manually-taken object image group to obtain a predictive search range, the manually-taken object image group including the plurality of object images taken while manually moving the focal position within the predetermined range, and further calculating a contrast peak value within the predetermined range based on pieces of contrast information on the manually-taken object image group; and
- calculating a second in-focus position within the predictive search range based on pieces of contrast information on an automatically-taken object image group, the automatically-taken object image group including the plurality of object images taken while automatically moving the focal position within the predictive search range, the predictive search range being determined with reference to the calculated first in-focus position; and
- attenuating the contrast peak value at a predetermined rate.

16. A vision measuring apparatus, comprising a processor for performing processes of:
- an image pickup capable of taking images of an object at arbitrary focal positions within a predetermined range;
- an obtainer configured to obtain a plurality of object images, the plurality of object images being taken by the image pickup while moving a focal position within the predetermined range;
- a first calculator capable of calculating a first in-focus position within the predetermined range based on pieces of contrast information on a manually-taken object image group to obtain a predictive search range, the manually-taken object image group including the plurality of object images taken while manually moving the focal position within the predetermined range, the first calculator configured to calculate a contrast peak value within the predetermined range based on pieces of contrast information on the manually-taken object image group;
- a second calculator capable of calculating a second in-focus position within the predictive search range based on pieces of contrast information on an automatically-taken object image group, the automatically-taken object image group including the plurality of object images taken while automatically moving the focal position within the predictive search range, the predictive search range being determined with reference to the calculated first in-focus position, and
- an attenuator configured to attenuate the contrast peak value at a predetermined rate.

17. The information processing apparatus, comprising a processor for performing processes of:
- an obtainer configured to obtain a plurality of object images, the plurality of object images being taken by an image pickup while moving a focal position within a predetermined range, the image pickup being capable of taking images of an object at arbitrary focal positions within the predetermined range;
- storage configured to store a map-for-calculation, the map-for-calculation including a plurality of divided areas;
- a setup configured to set a plurality of divided areas for each of the plurality of object images, the plurality of divided areas being obtained by dividing the object image, the plurality of divided areas corresponding to the plurality of areas of the map-for-calculation;
- a calculator configured:
  - to calculate divided-area in-focus positions for the divided areas based on pieces of contrast information on the plurality of divided areas, the plurality of divided areas being set for each object image, the divided-area in-focus positions being within the predetermined range,
  - to calculate a contrast peak value within the predetermined range based on pieces of contrast information on the plurality of divided areas, and
  - to calculate an in-focus position of the object image within the predetermined range based on the pieces of contrast information on the divided-area in-focus positions and
- an attenuator configured to attenuate the contrast peak value at a predetermined rate.

* * * * *